(12) United States Patent
Lim et al.

(10) Patent No.: US 12,295,420 B2
(45) Date of Patent: May 13, 2025

(54) AEROSOL GENERATION SYSTEM OF PREHEATING HEATER

(71) Applicant: KT&G CORPORATION, Daejeon (KR)

(72) Inventors: Hun Il Lim, Seoul (KR); Jong Sub Lee, Seongnam-si (KR); Dae Nam Han, Daejeon (KR); Jang Uk Lee, Seoul (KR); Jung Ho Han, Daejeon (KR); Jin Young Yoon, Seoul (KR); Young Lea Kim, Seoul (KR); Ji Soo Jang, Seoul (KR); Wang Seop Lim, Anyang-si (KR); Moon Bong Lee, Seoul (KR); Soung Ho Ju, Daejeon (KR); Du Jin Park, Seoul (KR); Seong Won Yoon, Yongin-si (KR)

(73) Assignee: KT&G CORPORATION, Daejeon (KR)

( * ) Notice: Subject to any disclaimer, the term of this patent is extended or adjusted under 35 U.S.C. 154(b) by 275 days.

(21) Appl. No.: 16/604,441

(22) PCT Filed: Apr. 9, 2018

(86) PCT No.: PCT/KR2018/004130
§ 371 (c)(1),
(2) Date: Oct. 10, 2019

(87) PCT Pub. No.: WO2018/190590
PCT Pub. Date: Oct. 18, 2018

(65) Prior Publication Data
US 2020/0154772 A1 May 21, 2020

(30) Foreign Application Priority Data

Apr. 11, 2017 (KR) .................. 10-2017-0046938
Jun. 19, 2017 (KR) .................. 10-2017-0077586
Jul. 3, 2017 (KR) .................. 10-2017-0084385

(51) Int. Cl.
*A24F 40/53* (2020.01)
*A24F 40/20* (2020.01)
(Continued)

(52) U.S. Cl.
CPC .............. *A24F 40/53* (2020.01); *A24F 40/20* (2020.01); *A24F 40/40* (2020.01); *A24F 40/46* (2020.01);
(Continued)

(58) Field of Classification Search
None
See application file for complete search history.

(56) References Cited

U.S. PATENT DOCUMENTS 2,638,904 A 5/1953 Mitchell
4,585,014 A 4/1986 Fry
(Continued)

FOREIGN PATENT DOCUMENTS

CA 2973143 A1 8/2016
CA 2975654 A1 8/2016
(Continued)

OTHER PUBLICATIONS

US 11,089,812 B2, 08/2021, Zuber et al. (withdrawn)
(Continued)

*Primary Examiner* — Katherine A Will
(74) *Attorney, Agent, or Firm* — Sughrue Mion, PLLC

(57) ABSTRACT

An aerosol generating system includes a holder generating aerosol by heating a cigarette, and a cradle having an inner space into which the holder is inserted, wherein the holder is electrically connected to the cradle to be moveable in the inner space of the cradle. The aerosol generating system includes a controller and a heater for heating an aerosol generating material, wherein the controller predicts insertion of the cigarette into the holder and preheats the heater in advance based on a prediction result.

15 Claims, 29 Drawing Sheets

(51) Int. Cl.
*A24F 40/40* (2020.01)
*A24F 40/46* (2020.01)
*A24F 40/48* (2020.01)
*A24F 40/50* (2020.01)
*A24F 40/51* (2020.01)
*A24F 40/57* (2020.01)
*A24F 40/60* (2020.01)
*A24F 40/85* (2020.01)
*A24F 40/90* (2020.01)
*A46B 15/00* (2006.01)
*H02J 7/00* (2006.01)
*H05B 3/03* (2006.01)
*H05B 3/06* (2006.01)
*A24D 1/20* (2020.01)

(52) U.S. Cl.
CPC .............. *A24F 40/48* (2020.01); *A24F 40/50* (2020.01); *A24F 40/51* (2020.01); *A24F 40/57* (2020.01); *A24F 40/60* (2020.01); *A24F 40/85* (2020.01); *A24F 40/90* (2020.01); *A46B 15/0055* (2013.01); *A46B 15/0097* (2013.01); *H02J 7/0044* (2013.01); *H05B 3/03* (2013.01); *H05B 3/06* (2013.01); *A24D 1/20* (2020.01); *A46B 2200/3013* (2013.01)

(56) References Cited

U.S. PATENT DOCUMENTS

| | | | |
|---|---|---|---|
| 4,637,407 A | 1/1987 | Bonanno et al. | |
| 5,144,962 A | 9/1992 | Counts et al. | |
| 5,240,012 A | 8/1993 | Ehrman et al. | |
| 5,249,586 A | 10/1993 | Morgan et al. | |
| 5,369,723 A | 11/1994 | Counts et al. | |
| 5,388,594 A | 2/1995 | Counts et al. | |
| 5,465,738 A | 11/1995 | Rowland | |
| 5,479,948 A | 1/1996 | Counts et al. | |
| 5,499,636 A | 3/1996 | Baggett, Jr. et al. | |
| 5,567,286 A | 10/1996 | Pal et al. | |
| 5,591,368 A | 1/1997 | Fleischhauer et al. | |
| 5,666,977 A | 9/1997 | Higgins et al. | |
| 5,666,978 A | 9/1997 | Counts et al. | |
| 5,878,752 A | 3/1999 | Adams et al. | |
| 5,967,148 A | 10/1999 | Harris et al. | |
| 6,040,560 A * | 3/2000 | Fleischhauer ........... A24F 40/53 |
| | | | 219/494 |
| 6,053,176 A | 4/2000 | Adams et al. | |
| 6,418,938 B1 | 7/2002 | Fleischhauer et al. | |
| 6,532,965 B1 | 3/2003 | Abhulimen et al. | |
| 6,615,840 B1 | 9/2003 | Fournier et al. | |
| 6,810,883 B2 | 11/2004 | Felter et al. | |
| 7,861,726 B1 | 1/2011 | Lukasavitz | |
| 8,375,959 B2 | 2/2013 | Dittrich et al. | |
| 8,419,085 B2 | 4/2013 | Kim et al. | |
| 8,464,726 B2 | 6/2013 | Sebastian et al. | |
| 8,752,545 B2 | 6/2014 | Buchberger | |
| 8,851,081 B2 | 10/2014 | Fernando et al. | |
| 8,973,587 B2 | 3/2015 | Liu | |
| 9,078,472 B2 | 7/2015 | Liu | |
| 9,078,473 B2 | 7/2015 | Worm et al. | |
| 9,115,471 B2 | 8/2015 | Zitturi et al. | |
| 9,220,304 B2 | 12/2015 | Greim | |
| 9,271,528 B2 | 3/2016 | Liu | |
| 9,301,548 B2 | 4/2016 | Liu | |
| 9,320,299 B2 | 4/2016 | Hearn et al. | |
| 9,423,152 B2 | 8/2016 | Ampolini et al. | |
| 9,427,023 B2 | 8/2016 | Liu | |
| 9,439,453 B2 | 9/2016 | Conner et al. | |
| 9,497,991 B2 | 11/2016 | Besso et al. | |
| 9,499,332 B2 | 11/2016 | Fernando et al. | |
| 9,504,279 B2 | 11/2016 | Chen | |
| 9,516,899 B2 | 12/2016 | Plojoux et al. | |
| 9,532,603 B2 | 1/2017 | Plojoux et al. | |
| 9,560,883 B2 | 2/2017 | Hawes | |
| 9,603,388 B2 | 3/2017 | Fernando et al. |
| 9,655,383 B2 | 5/2017 | Holzherr et al. |
| 9,693,587 B2 | 7/2017 | Plojoux et al. |
| 9,723,871 B2 | 8/2017 | Xiang |
| 9,795,166 B2 | 10/2017 | Liu |
| 9,814,263 B2 | 11/2017 | Cochand et al. |
| 9,854,841 B2 | 1/2018 | Ampolini et al. |
| 9,854,845 B2 | 1/2018 | Plojoux et al. |
| 9,894,934 B2 | 2/2018 | Li et al. |
| 9,903,071 B2 | 2/2018 | Kominami |
| 9,912,955 B2 | 3/2018 | Song et al. |
| 9,918,494 B2 | 3/2018 | Mironov et al. |
| 9,955,724 B2 | 5/2018 | Lord |
| 9,986,760 B2 | 6/2018 | Macko et al. |
| 9,999,247 B2 | 6/2018 | Ruscio et al. |
| 10,015,990 B2 | 7/2018 | Mironov |
| 10,031,183 B2 | 7/2018 | Novak, III et al. |
| 10,070,667 B2 | 9/2018 | Lord et al. |
| 10,104,911 B2 | 10/2018 | Thorens et al. |
| 10,130,780 B2 | 11/2018 | Talon |
| 10,136,673 B2 | 11/2018 | Mironov |
| 10,159,283 B2 | 12/2018 | Mironov |
| 10,194,697 B2 | 2/2019 | Fernando et al. |
| 10,299,513 B2 | 5/2019 | Perez et al. |
| 10,368,584 B2 | 8/2019 | Fernando et al. |
| 10,439,419 B2 | 10/2019 | Bernauer et al. |
| 10,440,987 B2 | 10/2019 | Zeng et al. |
| 10,448,670 B2 | 10/2019 | Talon et al. |
| 10,492,542 B1 | 12/2019 | Worm et al. |
| 10,548,350 B2 | 2/2020 | Greim et al. |
| 10,555,553 B2 | 2/2020 | Binassi et al. |
| 10,555,555 B2 | 2/2020 | Fernando et al. |
| 10,588,351 B2 | 3/2020 | Ricketts |
| 10,617,149 B2 | 4/2020 | Malgat et al. |
| 10,645,971 B2 | 5/2020 | Zitzke |
| 10,668,058 B2 | 6/2020 | Rose et al. |
| 10,716,329 B2 | 7/2020 | Matsumoto et al. |
| 10,757,975 B2 | 9/2020 | Batista et al. |
| 10,813,174 B2 | 10/2020 | Schneider et al. |
| 10,881,143 B2 | 1/2021 | Suzuki et al. |
| 11,039,642 B2 | 6/2021 | Zuber et al. |
| 11,147,316 B2 | 10/2021 | Farine et al. |
| 11,445,576 B2 | 9/2022 | Zinovik et al. |
| 11,627,759 B2 | 4/2023 | Han et al. |
| 2004/0261802 A1 | 12/2004 | Griffin et al. |
| 2005/0045198 A1 | 3/2005 | Larson et al. |
| 2005/0172976 A1 | 8/2005 | Newman et al. |
| 2006/0030214 A1 | 2/2006 | Katou et al. |
| 2008/0001052 A1 | 1/2008 | Kalous et al. |
| 2009/0283103 A1 | 11/2009 | Nielsen et al. |
| 2010/0001538 A1 | 1/2010 | Kim et al. |
| 2010/0024834 A1 | 2/2010 | Oglesby et al. |
| 2010/0242977 A1 | 9/2010 | Tarora et al. |
| 2010/0307518 A1 | 12/2010 | Wang |
| 2011/0126848 A1 | 6/2011 | Zuber et al. |
| 2011/0155151 A1 | 6/2011 | Newman et al. |
| 2011/0209717 A1 | 9/2011 | Han |
| 2011/0226236 A1 | 9/2011 | Buchberger |
| 2011/0265806 A1 | 11/2011 | Alarcon et al. |
| 2011/0290248 A1 | 12/2011 | Schennum |
| 2011/0290269 A1 | 12/2011 | Shimizu |
| 2012/0006343 A1 | 1/2012 | Renaud et al. |
| 2012/0048266 A1 | 3/2012 | Alelov |
| 2012/0227753 A1 | 9/2012 | Newton |
| 2012/0247494 A1 | 10/2012 | Oglesby et al. |
| 2012/0325232 A1 | 12/2012 | Yokogawa et al. |
| 2013/0014772 A1 | 1/2013 | Liu |
| 2013/0037041 A1 | 2/2013 | Worm et al. |
| 2013/0074857 A1 | 3/2013 | Buchberger |
| 2013/0213419 A1 | 8/2013 | Tucker et al. |
| 2013/0233329 A1 | 9/2013 | Sebastian et al. |
| 2013/0284192 A1 | 10/2013 | Peleg et al. |
| 2013/0319439 A1 | 12/2013 | Gorelick et al. |
| 2013/0319999 A1 | 12/2013 | Plojoux et al. |
| 2013/0340775 A1 | 12/2013 | Juster et al. |
| 2014/0014125 A1 | 1/2014 | Fernando et al. |
| 2014/0020698 A1 | 1/2014 | Fiebelkorn |
| 2014/0096782 A1 | 4/2014 | Ampolini et al. |
| 2014/0101960 A1 | 4/2014 | Kida et al. |

(56) References Cited

U.S. PATENT DOCUMENTS

| | | |
|---|---|---|
| 2014/0116455 A1 | 5/2014 | Youn |
| 2014/0246035 A1 | 9/2014 | Minskoff et al. |
| 2014/0278250 A1* | 9/2014 | Smith .................... G01N 19/00 702/187 |
| 2014/0299137 A1 | 10/2014 | Kieckbusch et al. |
| 2014/0301721 A1 | 10/2014 | Ruscio et al. |
| 2014/0305448 A1 | 10/2014 | Zuber et al. |
| 2014/0318559 A1 | 10/2014 | Thorens et al. |
| 2014/0345633 A1 | 11/2014 | Talon et al. |
| 2014/0345634 A1 | 11/2014 | Zuber et al. |
| 2014/0363145 A1 | 12/2014 | Plojoux et al. |
| 2014/0366898 A1* | 12/2014 | Monsees ................ A24F 40/30 131/329 |
| 2015/0007838 A1 | 1/2015 | Fernando et al. |
| 2015/0013696 A1 | 1/2015 | Plojoux et al. |
| 2015/0020832 A1 | 1/2015 | Greim et al. |
| 2015/0024355 A1 | 1/2015 | Ghofrani et al. |
| 2015/0027474 A1 | 1/2015 | Zuber et al. |
| 2015/0059996 A1 | 3/2015 | Zitturi et al. |
| 2015/0100441 A1 | 4/2015 | Alarcon et al. |
| 2015/0136124 A1 | 5/2015 | Aronie et al. |
| 2015/0136154 A1 | 5/2015 | Mitrev et al. |
| 2015/0189910 A1 | 7/2015 | Sebastian et al. |
| 2015/0201676 A1 | 7/2015 | Shin |
| 2015/0208725 A1 | 7/2015 | Tsai |
| 2015/0208730 A1 | 7/2015 | Li et al. |
| 2015/0245654 A1 | 9/2015 | Memari et al. |
| 2015/0245666 A1 | 9/2015 | Memari et al. |
| 2015/0245668 A1* | 9/2015 | Memari .................. A24F 40/48 206/250 |
| 2015/0257445 A1 | 9/2015 | Henry, Jr. et al. |
| 2015/0272211 A1 | 10/2015 | Chung |
| 2015/0296878 A1 | 10/2015 | Mucalo et al. |
| 2015/0359259 A1 | 12/2015 | Conner et al. |
| 2016/0150824 A1 | 6/2016 | Memari et al. |
| 2016/0205998 A1 | 7/2016 | Matsumoto et al. |
| 2016/0213066 A1 | 7/2016 | Zitzke et al. |
| 2016/0235121 A1 | 8/2016 | Rogan et al. |
| 2016/0270437 A1 | 9/2016 | Nappi |
| 2016/0286861 A1 | 10/2016 | Liu |
| 2016/0302488 A1 | 10/2016 | Fernando et al. |
| 2016/0331032 A1 | 11/2016 | Malgat et al. |
| 2016/0331032 A1 | 11/2016 | Malgat et al. |
| 2016/0345629 A1 | 12/2016 | Mironov |
| 2016/0366933 A1 | 12/2016 | Liu |
| 2016/0366937 A1 | 12/2016 | Liu |
| 2016/0366946 A1 | 12/2016 | Murison et al. |
| 2016/0374402 A1 | 12/2016 | Fernando et al. |
| 2017/0006916 A1 | 1/2017 | Liu |
| 2017/0006919 A1 | 1/2017 | Liu |
| 2017/0027229 A1 | 2/2017 | Cameron |
| 2017/0027234 A1 | 2/2017 | Farine et al. |
| 2017/0042243 A1 | 2/2017 | Plojoux et al. |
| 2017/0042251 A1 | 2/2017 | Yamada et al. |
| 2017/0042252 A1 | 2/2017 | Takeuchi et al. |
| 2017/0055580 A1 | 3/2017 | Blandino et al. |
| 2017/0065002 A1 | 3/2017 | Fernando et al. |
| 2017/0071251 A1 | 3/2017 | Goch |
| 2017/0071259 A1 | 3/2017 | Yamada et al. |
| 2017/0095006 A1 | 4/2017 | Egoyants et al. |
| 2017/0150757 A1 | 6/2017 | Worm et al. |
| 2017/0164659 A1 | 6/2017 | Schneider et al. |
| 2017/0172214 A1 | 6/2017 | Li et al. |
| 2017/0172215 A1 | 6/2017 | Li et al. |
| 2017/0188634 A1 | 7/2017 | Plojoux et al. |
| 2017/0238596 A1 | 8/2017 | Matsumoto et al. |
| 2017/0295844 A1 | 10/2017 | Thevenaz et al. |
| 2018/0153216 A1 | 6/2018 | Wong et al. |
| 2018/0177234 A1 | 6/2018 | Lee |
| 2018/0206556 A1 | 7/2018 | Thorens et al. |
| 2018/0235283 A1 | 8/2018 | Zuber et al. |
| 2018/0280653 A1 | 10/2018 | Buchberger |
| 2019/0014826 A1 | 1/2019 | Thorens et al. |
| 2019/0075849 A1 | 3/2019 | Hawes |
| 2019/0116633 A1 | 4/2019 | Qiu |
| 2019/0297937 A1 | 10/2019 | Guyard et al. |
| 2019/0320719 A1 | 10/2019 | Liu et al. |
| 2019/0364975 A1 | 12/2019 | Fernando et al. |
| 2020/0006950 A1 | 1/2020 | Holzherr |
| 2020/0008475 A1 | 1/2020 | Lai et al. |
| 2020/0008480 A1 | 1/2020 | Batista |
| 2020/0120983 A1 | 4/2020 | Chen |
| 2020/0154765 A1 | 5/2020 | Lee et al. |
| 2020/0232766 A1 | 7/2020 | Flick |
| 2020/0305508 A1 | 10/2020 | Talon |
| 2020/0352224 A1 | 11/2020 | Plojoux et al. |
| 2020/0352231 A1 | 11/2020 | Han et al. |
| 2020/0359681 A1 | 11/2020 | Han et al. |
| 2020/0359682 A1 | 11/2020 | Han et al. |
| 2020/0413495 A1 | 12/2020 | Schneider et al. |
| 2021/0000182 A1 | 1/2021 | Ruscio et al. |
| 2021/0077752 A1 | 3/2021 | Buchberger |
| 2021/0120875 A1 | 4/2021 | Mironov |
| 2022/0087309 A1 | 3/2022 | Han et al. |
| 2022/0117293 A1 | 4/2022 | Zuber et al. |

FOREIGN PATENT DOCUMENTS

| | | |
|---|---|---|
| CH | 310239 A | 12/1955 |
| CN | 2146758 Y | 11/1993 |
| CN | 1102964 A | 5/1995 |
| CN | 1122213 A | 5/1996 |
| CN | 1190335 A | 8/1998 |
| CN | 1209731 A | 3/1999 |
| CN | 1205388 C | 6/2005 |
| CN | 1212785 C | 8/2005 |
| CN | 2857109 Y | 1/2007 |
| CN | 1973706 A | 6/2007 |
| CN | 101043827 A | 9/2007 |
| CN | 101444335 A | 6/2009 |
| CN | 201467999 U | 5/2010 |
| CN | 201491717 U | 6/2010 |
| CN | 101896082 A | 11/2010 |
| CN | 101940369 A | 1/2011 |
| CN | 102006790 A | 4/2011 |
| CN | 102109393 A | 6/2011 |
| CN | 102216526 A | 10/2011 |
| CN | 102326869 A | 1/2012 |
| CN | 102438470 A | 5/2012 |
| CN | 102481021 A | 5/2012 |
| CN | 202407082 U | 9/2012 |
| CN | 102762118 A | 10/2012 |
| CN | 102821632 A | 12/2012 |
| CN | 102934843 A | 2/2013 |
| CN | 202774134 U | 3/2013 |
| CN | 103096741 A | 5/2013 |
| CN | 103281920 A | 9/2013 |
| CN | 103338665 A | 10/2013 |
| CN | 103501644 A | 1/2014 |
| CN | 103622162 A | 3/2014 |
| CN | 203457802 U | 3/2014 |
| CN | 103717802 A | 4/2014 |
| CN | 103717803 A | 4/2014 |
| CN | 203563687 U | 4/2014 |
| CN | 203575658 U | 5/2014 |
| CN | 103859606 A | 6/2014 |
| CN | 203633505 U | 6/2014 |
| CN | 203646503 U | 6/2014 |
| CN | 103929988 A | 7/2014 |
| CN | 103929989 A | 7/2014 |
| CN | 203689071 U | 7/2014 |
| CN | 203692545 U | 7/2014 |
| CN | 103974638 A | 8/2014 |
| CN | 103974640 A | 8/2014 |
| CN | 103987286 A | 8/2014 |
| CN | 103997921 A | 8/2014 |
| CN | 103997922 A | 8/2014 |
| CN | 203789137 U | 8/2014 |
| CN | 104023568 A | 9/2014 |
| CN | 104023574 A | 9/2014 |
| CN | 104039183 A | 9/2014 |
| CN | 203814592 U | 9/2014 |
| CN | 104095295 A | 10/2014 |
| CN | 104106842 A | 10/2014 |

(56) References Cited

FOREIGN PATENT DOCUMENTS

| | | |
|---|---|---|
| CN | 104135882 A | 11/2014 |
| CN | 203943078 U | 11/2014 |
| CN | 104203015 A | 12/2014 |
| CN | 204070570 U | 1/2015 |
| CN | 2041 46338 U | 2/2015 |
| CN | 102811634 B | 3/2015 |
| CN | 104382237 A | 3/2015 |
| CN | 104470387 A | 3/2015 |
| CN | 104489933 A | 4/2015 |
| CN | 104544559 A | 4/2015 |
| CN | 204317494 U | 5/2015 |
| CN | 204317504 U | 5/2015 |
| CN | 205197003 U | 5/2015 |
| CN | 104754964 A | 7/2015 |
| CN | 104770878 A | 7/2015 |
| CN | 104799438 A | 7/2015 |
| CN | 104812260 A | 7/2015 |
| CN | 204444239 U | 7/2015 |
| CN | 104839886 A | 8/2015 |
| CN | 104869854 A | 8/2015 |
| CN | 104886775 A | 9/2015 |
| CN | 104902767 A | 9/2015 |
| CN | 204763414 U | 11/2015 |
| CN | 105163610 A | 12/2015 |
| CN | 105208882 A | 12/2015 |
| CN | 105208884 A | 12/2015 |
| CN | 105341993 A | 2/2016 |
| CN | 105357994 A | 2/2016 |
| CN | 205018293 U | 2/2016 |
| CN | 105361250 A | 3/2016 |
| CN | 105453598 A | 3/2016 |
| CN | 205072064 U | 3/2016 |
| CN | 205180371 U | 4/2016 |
| CN | 105722416 A | 6/2016 |
| CN | 205337598 U | 6/2016 |
| CN | 105747281 A | 7/2016 |
| CN | 105789506 A | 7/2016 |
| CN | 105831812 A | 8/2016 |
| CN | 105848503 A | 8/2016 |
| CN | 105852223 A | 8/2016 |
| CN | 105876869 A | 8/2016 |
| CN | 205456048 U | 8/2016 |
| CN | 205512358 U | 8/2016 |
| CN | 105939625 A | 9/2016 |
| CN | 205597118 U | 9/2016 |
| CN | 106037014 A | 10/2016 |
| CN | 205648910 U | 10/2016 |
| CN | 205658366 U | 10/2016 |
| CN | 104135881 B | 11/2016 |
| CN | 106102492 A | 11/2016 |
| CN | 106132217 A | 11/2016 |
| CN | 106136332 A | 11/2016 |
| CN | 106163307 A | 11/2016 |
| CN | 205728067 U | 11/2016 |
| CN | 106174699 A | 12/2016 |
| CN | 106231934 A | 12/2016 |
| CN | 106255430 A | 12/2016 |
| CN | 205831062 U | 12/2016 |
| CN | 205884659 U | 1/2017 |
| CN | 106376975 A | 2/2017 |
| CN | 106413439 A | 2/2017 |
| CN | 106413444 A | 2/2017 |
| CN | 106455708 A | 2/2017 |
| CN | 106455714 A | 2/2017 |
| CN | 106455716 A | 2/2017 |
| CN | 106473233 A | 3/2017 |
| CN | 106535680 A | 3/2017 |
| CN | 206025202 U | 3/2017 |
| CN | 206097720 U | 4/2017 |
| CN | 206197012 U | 5/2017 |
| CN | 106858726 A | 6/2017 |
| CN | 106901404 A | 6/2017 |
| CN | 206312988 U | 7/2017 |
| CN | 107080292 A | 8/2017 |
| CN | 206443202 U | 8/2017 |
| CN | 206472849 U | 9/2017 |
| CN | 207220157 U | 4/2018 |
| CN | 105342011 B | 6/2018 |
| CN | 207836767 U | 9/2018 |
| CN | 208192123 U | 12/2018 |
| CN | 208192126 U | 12/2018 |
| CN | 110494053 B | 5/2022 |
| DE | 3302518 A1 | 7/1984 |
| DE | 20 2014 004 361 U1 | 10/2015 |
| EA | 012169 B1 | 8/2009 |
| EA | 026076 B1 | 2/2017 |
| EP | 1119267 B1 | 7/2004 |
| EP | 1 964 482 A1 | 9/2008 |
| EP | 2 110 033 A1 | 10/2009 |
| EP | 2113178 A1 | 11/2009 |
| EP | 2 201 850 A1 | 6/2010 |
| EP | 2253233 A1 | 11/2010 |
| EP | 2316286 A1 | 5/2011 |
| EP | 2022349 B1 | 7/2014 |
| EP | 2 875 740 A2 | 5/2015 |
| EP | 2 531 053 B1 | 9/2015 |
| EP | 2921065 A1 | 9/2015 |
| EP | 2 740 370 B1 | 4/2016 |
| EP | 3 082 483 A1 | 10/2016 |
| EP | 3 098 738 A1 | 11/2016 |
| EP | 2 432 339 B1 | 3/2017 |
| EP | 3 179 828 A1 | 6/2017 |
| EP | 3 632 237 A1 | 4/2020 |
| EP | 3 632 239 A1 | 4/2020 |
| EP | 3 275 319 B1 | 8/2020 |
| EP | 3727055 A1 | 10/2020 |
| GB | 2542018 A | 3/2017 |
| GB | 201605104 A | 11/2017 |
| JP | 2-190178 A | 7/1990 |
| JP | 3-232481 A | 10/1991 |
| JP | 6-209756 A | 8/1994 |
| JP | 7-184627 A | 7/1995 |
| JP | 11-40122 A | 2/1999 |
| JP | 11-164679 A | 6/1999 |
| JP | 3645921 B2 | 5/2005 |
| JP | 2006-92831 A | 4/2006 |
| JP | 2006-320286 A | 11/2006 |
| JP | 4278306 B2 | 6/2009 |
| JP | 2010-178730 A | 8/2010 |
| JP | 2010-526553 A | 8/2010 |
| JP | 2011-87569 A | 5/2011 |
| JP | 2011-518567 A | 6/2011 |
| JP | 4739433 B2 | 8/2011 |
| JP | 2012-506263 A | 3/2012 |
| JP | 2012-527222 A | 11/2012 |
| JP | 2013-519384 A | 5/2013 |
| JP | 2014-500017 A | 1/2014 |
| JP | 2014-79229 A | 5/2014 |
| JP | 2014-511175 A | 5/2014 |
| JP | 2014-521419 A | 8/2014 |
| JP | 2014-525237 A | 9/2014 |
| JP | 2014-533513 A | 12/2014 |
| JP | 2014-534813 A | 12/2014 |
| JP | 2015-503335 A | 2/2015 |
| JP | 2015-503916 A | 2/2015 |
| JP | 2015-504669 A | 2/2015 |
| JP | 2015-506170 A | 3/2015 |
| JP | 2015-507477 A | 3/2015 |
| JP | 2015-508996 A | 3/2015 |
| JP | 2015-524261 A | 8/2015 |
| JP | 2015-156806 A | 9/2015 |
| JP | 2015-180214 A | 10/2015 |
| JP | 2015-529458 A | 10/2015 |
| JP | 2015-204833 A | 11/2015 |
| JP | 2016-528910 A | 9/2016 |
| JP | 3207506 U | 11/2016 |
| JP | 2016-538848 A | 12/2016 |
| JP | 2017-501682 A | 1/2017 |
| JP | 2017-46700 A | 3/2017 |
| JP | 2017-51189 A | 3/2017 |
| JP | 2017-70297 A | 4/2017 |
| JP | 2017-514463 A | 6/2017 |
| JP | 2021-153586 A | 10/2021 |
| KR | 1999-007914 A | 1/1999 |

(56) References Cited

FOREIGN PATENT DOCUMENTS

| | | |
|---|---|---|
| KR | 10-0304044 B1 | 11/2001 |
| KR | 10-0636287 B1 | 10/2006 |
| KR | 10-0806461 B1 | 2/2008 |
| KR | 20-2009-0008911 U | 9/2009 |
| KR | 10-0965099 B1 | 6/2010 |
| KR | 10-1001077 B1 | 12/2010 |
| KR | 10-2011-0096548 A | 8/2011 |
| KR | 20-2011-0009632 U | 10/2011 |
| KR | 10-1098112 B1 | 12/2011 |
| KR | 10-2012-0027029 A | 3/2012 |
| KR | 10-2012-0080285 A | 7/2012 |
| KR | 10-2012-0101637 A | 9/2012 |
| KR | 10-1184499 B1 | 9/2012 |
| KR | 10-2012-0109634 A | 10/2012 |
| KR | 10-2012-0114333 A | 10/2012 |
| KR | 10-2012-0121314 A | 11/2012 |
| KR | 10-2013-0027909 A | 3/2013 |
| KR | 20-0466757 Y1 | 5/2013 |
| KR | 10-2013-0081238 A | 7/2013 |
| KR | 20-0469513 Y1 | 10/2013 |
| KR | 10-2013-0139296 A | 12/2013 |
| KR | 10-2014-0015774 A | 2/2014 |
| KR | 10-1383577 B1 | 4/2014 |
| KR | 10-2014-0068203 A | 6/2014 |
| KR | 10-2014-0092312 A | 7/2014 |
| KR | 10-2014-0114554 A | 9/2014 |
| KR | 10-2014-0116055 A | 10/2014 |
| KR | 10-2014-0118983 A | 10/2014 |
| KR | 10-2014-0119072 A | 10/2014 |
| KR | 10-2014-0135774 A | 11/2014 |
| KR | 20-2014-0006242 U | 12/2014 |
| KR | 10-2015-0030409 A | 3/2015 |
| KR | 10-2015-0033617 A | 4/2015 |
| KR | 10-2015-0058569 A | 5/2015 |
| KR | 10-1516304 B1 | 5/2015 |
| KR | 10-1523088 B1 | 5/2015 |
| KR | 10-1523088 B2 | 5/2015 |
| KR | 10-2015-0099704 A | 9/2015 |
| KR | 10-2015-0099771 A | 9/2015 |
| KR | 10-2016-0009678 A | 1/2016 |
| KR | 10-2016-0012110 A | 2/2016 |
| KR | 10-2016-0012329 A | 2/2016 |
| KR | 10-2016-0015144 A | 2/2016 |
| KR | 10-2016-0040643 A | 4/2016 |
| KR | 10-1609715 B1 | 4/2016 |
| KR | 10-2016-0052607 A | 5/2016 |
| KR | 10-2016-0060006 A | 5/2016 |
| KR | 10-1619032 B1 | 5/2016 |
| KR | 20-2016-0001476 U | 5/2016 |
| KR | 10-2016-0088163 A | 7/2016 |
| KR | 10-2016-0094938 A | 8/2016 |
| KR | 10-2016-0096744 A | 8/2016 |
| KR | 10-2016-0108855 A | 9/2016 |
| KR | 10-2016-0110670 A | 9/2016 |
| KR | 10-1656061 B1 | 9/2016 |
| KR | 10-2016-0114743 A | 10/2016 |
| KR | 10-2016-0124091 A | 10/2016 |
| KR | 10-1667124 B1 | 10/2016 |
| KR | 10-1668175 B1 | 10/2016 |
| KR | 10-2016-0129024 A | 11/2016 |
| KR | 10-2016-0131035 A | 11/2016 |
| KR | 10-2016-0133665 A | 11/2016 |
| KR | 10-2016-0137627 A | 11/2016 |
| KR | 10-1679489 B1 | 11/2016 |
| KR | 10-2016-0140608 A | 12/2016 |
| KR | 10-2016-0142896 A | 12/2016 |
| KR | 10-2016-0147253 A | 12/2016 |
| KR | 10-1690389 B1 | 12/2016 |
| KR | 10-2017-0006282 A | 1/2017 |
| KR | 10-2017-0007262 A | 1/2017 |
| KR | 10-2017-0044158 A | 4/2017 |
| KR | 10-2017-0071486 A | 6/2017 |
| KR | 10-2017-0074898 A | 6/2017 |
| KR | 10-1740160 B1 | 6/2017 |
| KR | 10-2017-0119664 A | 10/2017 |
| KR | 10-2018-0070457 A | 6/2018 |
| RU | 2302806 C2 | 7/2007 |
| RU | 2425608 C2 | 8/2011 |
| RU | 2 531 890 C2 | 10/2014 |
| RU | 2564600 C1 | 10/2015 |
| RU | 2014 125 232 A | 12/2015 |
| RU | 2581999 C2 | 4/2016 |
| RU | 2589437 C2 | 7/2016 |
| RU | 2594557 C2 | 8/2016 |
| RU | 2595593 C2 | 8/2016 |
| RU | 2 602 053 C2 | 11/2016 |
| RU | 2 602 962 C2 | 11/2016 |
| RU | 2 603 559 C2 | 11/2016 |
| RU | 2604012 C2 | 12/2016 |
| UA | 104628 C2 | 2/2014 |
| UA | 112169 C2 | 8/2016 |
| WO | 94/06314 A1 | 3/1994 |
| WO | 95/33246 A1 | 12/1995 |
| WO | 98/23171 A1 | 6/1998 |
| WO | 0027232 A1 | 5/2000 |
| WO | 2010/133342 A1 | 11/2010 |
| WO | 2011/028372 A1 | 3/2011 |
| WO | 2011/050964 A1 | 5/2011 |
| WO | 2011/095781 A1 | 8/2011 |
| WO | 2012/072264 A1 | 6/2012 |
| WO | 2012/123702 A1 | 9/2012 |
| WO | 2012126721 A1 | 9/2012 |
| WO | 2013/021863 A1 | 2/2013 |
| WO | 2013/034458 A1 | 3/2013 |
| WO | 2013/060743 A2 | 5/2013 |
| WO | 2013/076098 A2 | 5/2013 |
| WO | 2013/093695 A1 | 6/2013 |
| WO | 2013/098395 A1 | 7/2013 |
| WO | 2013/098396 A2 | 7/2013 |
| WO | 2013/098397 A2 | 7/2013 |
| WO | 2013/098398 A3 | 7/2013 |
| WO | 2013/098409 A1 | 7/2013 |
| WO | 2013/102609 A2 | 7/2013 |
| WO | 2013/102612 A1 | 7/2013 |
| WO | 2013/120565 A3 | 8/2013 |
| WO | 2013/126777 A2 | 8/2013 |
| WO | 2013/137084 A1 | 9/2013 |
| WO | 2013/171217 A1 | 11/2013 |
| WO | 2013/190036 A1 | 12/2013 |
| WO | 2014/029880 A2 | 2/2014 |
| WO | 2014/075369 A1 | 5/2014 |
| WO | 2014/102092 A1 | 7/2014 |
| WO | 2015/046386 A1 | 4/2015 |
| WO | 2015/088744 A1 | 6/2015 |
| WO | 2015/117704 A1 | 8/2015 |
| WO | 2015/128665 A1 | 9/2015 |
| WO | 2015155289 A1 | 10/2015 |
| WO | 2015/165813 A1 | 11/2015 |
| WO | 2015/174657 A1 | 11/2015 |
| WO | 2015/177044 A1 | 11/2015 |
| WO | 2015197627 A1 | 12/2015 |
| WO | 2016/012811 A1 | 1/2016 |
| WO | 2016/055653 A1 | 4/2016 |
| WO | 2016/059073 A1 | 4/2016 |
| WO | 2016/075028 A1 | 5/2016 |
| WO | 2016/076147 A1 | 5/2016 |
| WO | 2016/107766 A1 | 7/2016 |
| WO | 2016/124550 A1 | 8/2016 |
| WO | 2016/124552 A1 | 8/2016 |
| WO | 2016/150019 A1 | 9/2016 |
| WO | 2016/156103 A1 | 10/2016 |
| WO | 2016-156121 A1 | 10/2016 |
| WO | 2016/156219 A1 | 10/2016 |
| WO | 2016/159013 A1 | 10/2016 |
| WO | 2016/166064 A1 | 10/2016 |
| WO | 2016/178377 A1 | 11/2016 |
| WO | 2016/187803 A1 | 12/2016 |
| WO | 2017/029088 A1 | 2/2017 |
| WO | 2017/029089 A1 | 2/2017 |
| WO | 2017/037457 A1 | 3/2017 |
| WO | 2017/042297 A1 | 3/2017 |
| WO | 2017/075759 A1 | 5/2017 |
| WO | 2017-075975 A1 | 5/2017 |
| WO | 2017/139963 A1 | 8/2017 |

(56) References Cited

FOREIGN PATENT DOCUMENTS

| WO | 2018/050449 A1 | 3/2018 |
|---|---|---|
| WO | 2018/189195 A1 | 10/2018 |
| WO | 2019-014991 A1 | 1/2019 |
| WO | 2019/020826 A1 | 1/2019 |
| WO | 2019/030172 A1 | 2/2019 |
| WO | 2019/095268 A1 | 5/2019 |
| WO | 2019-121808 A1 | 6/2019 |

OTHER PUBLICATIONS

Extended European Search Report issued Dec. 11, 2020 in European Application No. 20188967.2.
Extended European Search Report issued Jan. 15, 2021 in European Application No. 20188949.0.
Extended European Search Report issued Dec. 16, 2020 in European Application No. 20188985.4.
Office Action issued Dec. 30, 2020 in Russian Application No. 2020124651.
Office Action issued Dec. 28, 2020 in Russian Application No. 2020124652.
Office Action issued Dec. 11, 2020 in Russian Application No. 2020124653.
Office Action issued Jan. 22, 2021 in Russian Application No. 2020124657.
Office Action issued Jan. 22, 2021 in Russian Application No. 2020124658.
Extended European Search Report issued Dec. 18, 2020 in European Application No. 18775504.6.
Office Action issued Jan. 19, 2021 in Japanese Application No. 2019-553569.
Extended European Search Report issued Jan. 14, 2021 in European Application No. 18784738.9.
Extended European Search Report issued Dec. 10, 2020 in European Application No. 20188932.6.
Office Action issued Jan. 12, 2021 in Japanese Application No. 2019-555201.
Office Action issued Jan. 12, 2021 in Japanese Application No. 2019-555169.
Office Action issued Jan. 5, 2021 in Japanese Application No. 2019-558557.
Extended European Search Report issued Nov. 19, 2020 in European Application No. 20188792.4.
Office Action issued Dec. 1, 2020 in Japanese Application No. 2020-501188.
Extended European Search Report issued Dec. 18, 2020 in European Application No. 20188926.8.
Office Action issued Jan. 19, 2021 in Japanese Application No. 2020-501514.
Office Action issued Sep. 24, 2020 in Korean Application No. 10-2018-0012456.
Office Action issued May 28, 2020 in Korean Application No. 10-2017-0147605.
International Search Report issued Jul. 24, 2018 in International Application No. PCT/KR2018/003691.
Office Action issued Jul. 2, 2019 in Korean Application No. 10-2019-0018815.
Office Action issued Jul. 3, 2019 in Korean Application No. 10-2019-0017391.
International Search Report issued Oct. 29, 2018 in International Application No. PCT/KR2018/004181.
International Search Report issued Sep. 6, 2018 in International Application No. PCT/KR2018/004179.
International Search Report issued Nov. 6, 2018 in International Application No. PCT/KR2018/004178.
International Search Report issued Sep. 6, 2018 in International Application No. PCT/KR2018/004176.
International Search Report issued Sep. 7, 2018 in International Application No. PCT/KR2018/004172.
International Search Report issued Sep. 7, 2018 in International Application No. PCT/KR2018/004171.
International Search Report issued Nov. 6, 2018 in International Application No. PCT/KR2018/004130.
International Search Report issued Nov. 6, 2018 in International Application No. PCT/KR2018/004129.
International Search Report issued Nov. 14, 2018 in International Application No. PCT/KR2018/004118.
International Search Report issued May 29, 2018 in International Application No. PCT/KR2017/012486.
Office Action issued Dec. 11, 2019 in Korean Application No. 10-2018-0010836.
Office Action issued Dec. 11, 2019 in Korean Application No. 10-2018-0010841.
Office Action issued Dec. 19, 2019 in Korean Application No. 10-2018-0090910.
Office Action issued Jan. 3, 2020 in Korean Application No. 10-2018-0012456.
Office Action issued Jan. 3, 2020 in Korean Application No. 10-2017-0084389.
Office Action issued Jan. 3, 2020 in Korean Application No. 10-2017-0084386.
Office Action issued Jan. 3, 2020 in Korean Application No. 10-2018-0018693.
Office Action issued Jan. 8, 2020 in Korean Application No. 10-2017-0128293.
Office Action issued Jan. 8, 2020 in Korean Application No. 10-2017-0119664.
Office Action issued Jan. 16, 2020 in Korean Application No. 10-2017-0084388.
Office Action issued Jan. 16, 2020 in Korean Application No. 10-2017-0084387.
Office Action issued Feb. 11, 2020 in Korean Application No. 10-2018-0010834.
Office Action issued Feb. 11, 2020 in Korean Application No. 10-2018-0010835.
Office Action issued Feb. 13, 2020 in Korean Application No. 10-2018-0010837.
Office Action issued Feb. 18, 2020 in Russian Application No. 2019121813.
Extended European Search Report issued Jan. 14, 2021 in European Application No. 18783776.0.
Extended European Search Report issued Jan. 25, 2021 in European Application No. 18785166.2.
Extended European Search Report issued Jan. 29, 2021 in European Application No. 18784464.2.
Extended European Search Report issued Mar. 15, 2021 in European Application No. 18785061.5.
Extended European Search Report issued Mar. 19, 2021 in European Application No. 18784164.8.
Extended European Search Report issued Mar. 24, 2021 in European Application No. 18784268.7.
Extended European Search Report issued Mar. 25, 2021 in European Application No. 18784370.1.
Extended European Search Report issued Mar. 25, 2021 in European Application No. 18784841.1.
Office Action issued Feb. 24, 2021 in Japanese Application No. 2019-555168.
Office Action issued Feb. 24, 2021 in Japanese Application No. 2019-555203.
Office Action issued Feb. 24, 2021 in Japanese Application No. 2019-555204.
Office Action issued Feb. 4, 2021 in Russian Application No. 2020124609.
Office Action issued Feb. 9, 2021 in Japanese Application No. 2019-555184.
Office Action issued Jan. 26, 2021 in Japanese Application No. 2020-501521.
Office Action issued Mar. 2, 2021 in Japanese Application No. 2019-555170.
Office Action issued Mar. 2, 2021 in Japanese Application No. 2019-555182.

(56) References Cited

OTHER PUBLICATIONS

Office Action issued Mar. 30, 2021 in Japanese Application No. 2020-501377.
Office Action issued Jan. 19, 2021 in Indonesian Application No. P00201906007.
Office Action issued Nov. 14, 2019 in Korean Application No. 10-2017-0084385.
Office Action issued Nov. 14, 2019 in Korean Application No. 10-2017-0147605.
Office Action dated Aug. 7, 2019 for Korean Patent Application No. 10-2018-0067035, and its English translation provided by Applicants foreign counsel.
Office Action dated Jun. 27, 2019 for Korean Patent Application No. 10-2018-0063759, and its English translation provided by Applicants foreign counsel.
Office Action dated Jul. 2, 2019 for Korean Patent Application No. 10-2019-0018815, and its English translation provided by Applicants foreign counsel.
Office Action dated Jul. 3, 2019 for Korean Patent Application No. 10-2019-0017391, and its English translation provided by Applicants foreign counsel.
International Preliminary Report on Patentability (Chapter I) issued on Jun. 18, 2019 for PCT/KR2017/012486 and its English translation from WIPO.
Written Opinion of the International Searching Authority for PCT/KR2017/012486 mailed May 29, 2018 and its English translation by Google Translate (now published as WO 2018/110834).
Partial supplementary European search report issued Aug. 3, 2020 in Application No. 17880867.1.
Extended European search report issued Nov. 4, 2020 by the European Patent Office in Application No. 17880867.1.
Office Action issued Oct. 29, 2020 by the Korean Patent Office in Application No. 10-2018-0010837.
Office Action issued Nov. 4, 2020 by the Japanese Patent Office in Application No. 2019-554453.
Office Action issued Nov. 4, 2020 by the Japanese Patent Office in Application No. 2020-128346.
Decision on Grant issued Nov. 26, 2020 by the Russian Federal Service for Intellectual Property Patent Application No. 2020124607.
Office Action issued Nov. 26, 2020 by Russian Federal Service for Intellectual Property Office Patent Application No. 2020124609.
Decision on Grant issued Oct. 26, 2020 by Russian Federal Service for Intellectual Property in Application No. 2020124610.
Office Action issued Jun. 29, 2020 by the Korean Patent Office in Application No. 10-2018-0010836.
Office Action issued Jul. 22, 2021 in Korean Application No. 10-2021-0051359.
Extended European Search Report issued Apr. 1, 2021 in European Application No. 18805933.1.
Extended European Search Report issued Jul. 1, 2021 in European Application No. 18854661.8.
Extended European Search Report issued Jun. 14, 2021 in European Application No. 18842951.8.
Extended European Search Report issued Jun. 16, 2021 in European Application No. 18853434.1.
International Search Report dated Aug. 29, 2018 in International Application No. PCT/KR2018/005945.
International Search Report dated Dec. 4, 2018 in International Application No. PCT/KR2018/006747.
International Search Report dated Feb. 28, 2019 in International Application No. PCT/KR2018/009100.
International Search Report dated Nov. 26, 2018 in International Application No. PCT/KR2018/009094.
International Search Report dated Nov. 30, 2018 in International Application No. PCT/KR2018/006702.
Office Action issued Apr. 25, 2019 in Korean Application No. 10-2019-0033784.
Office Action issued Apr. 4, 2019 in Korean Application No. 10-2019-0019194.
Office Action issued Apr. 4, 2019 in Korean Application No. 10-2019-0019195.
Office Action issued Apr. 5, 2019 in Korean Application No. 10-2019-0027638.
Office Action issued Apr. 9, 2021 in Korean Application No. 10-2020-0116256.
Office Action issued Jun. 10, 2021 in Russian Application No. 2020124657.
Office Action issued Jun. 10, 2021 in Russian Application No. 2020124658.
Office Action issued Jun. 29, 2021 in Chinese Application No. 201880022072.2.
Office Action issued May 5, 2021 in Canadian Application No. 3,047,236.
Extended European Search Report issued Oct. 27, 2021 in European Application No. 18844735.3.
Office Action issued Oct. 28, 2021 in Chinese Application No. 201880046418.2.
Office Action issued Sep. 24, 2021 in Chinese Application No. 201880024010.5.
Office Action issued Sep. 29, 2021 in Chinese Application No. 201880024276.X.
Office Action issued Sep. 29, 2021 in Chinese Application No. 201880024311.8.
Office Action issued Nov. 25, 2021 in Chinese Application No. 201880047174.X.
Office Action issued Dec. 1, 2021 in Chinese Application No. 201880046367.3.
Office Action dated Jul. 27, 2021 in Chinese Patent Application No. 201780084891.5.
Office Action dated Aug. 16, 2021 in Chinese Patent Application No. 201880024006.9.
Office Action dated Aug. 26, 2021 in Chinese Patent Application No. 201880024107.6.
Office Action dated Aug. 4, 2021 in Chinese Patent Application No. 201880024289.7.
Office Action dated Jul. 26, 2021 in Chinese Patent Application No. 201880024059.0.
Office Action dated Jul. 16, 2021 in Chinese Patent Application No. 201880024367.3.
Office Action dated Jul. 19, 2021 Chinese Patent Application No. 201880024070.7.
Office Action dated Sep. 17, 2021 in Chinese Patent Application No. 201880030699.2.
Office Action dated Sep. 20, 2022 from the Japanese Patent Office in JP Application No. 2021-174035.
Office Action dated Oct. 24, 2022 from the Ukrainian Patent Office in UA Application No. a202004868.
Office Action dated Oct. 27, 2022 from the Ukrainian Patent Office in UA Application No. a202004869.
Office Action dated Nov. 2, 2022 from the China National Intellectual Property Administration in CN Application No. 201880050526.7.
Office Action dated Nov. 22, 2022 from the China National Intellectual Property Administration in CN Application No. 202010762996.5.
Office Action dated Jan. 10, 2023, issued in Chinese Application No. 202010760990.4.
Office Action dated Jan. 3, 2023, issued in Chinese Application No. 202010760979.8.
Office Action dated Jan. 28, 2023, issued in Chinese Application No. 202010763214.X.
Office Action dated Jan. 10, 2023, issued in Japanese Application No. 2021-177649.
Office Action dated Dec. 30, 2022, issued in Chinese Application No. 202010756239.7.
Office Action dated Dec. 13, 2022, issued in Japanese Application No. 2021-165298.
Office Action dated Jun. 28, 2022, issued in Japanese Application No. 2021-075028.
Office Action dated May 29, 2022, issued in Philippines Application No. 1/2019/501361.

(56) References Cited

OTHER PUBLICATIONS

Office Action dated May 30, 2022, issued in Canadian Application No. 3,080,145.
Office Action dated Aug. 12, 2022, issued in Chinese Application No. 201880024059.0.
Communication dated Mar. 14, 2022 from the Chinese Patent Office in Chinese Application No. 201880024059.0.
Communication dated Feb. 28, 2022 from the Chinese Patent Office in Chinese Application No. 201880050526.7.
Office Action issued Jun. 1, 2023 in Korean Application No. 10-2022-0148790.
Office Action issued Jul. 12, 2023 in Ukrainian Application No. a 2021 04884.
Office Action issued May 9, 2023 in Japanese Application No. 2022-086448.
Communication issued Jul. 10, 2023 in European Application No. 18 785 166.2.
Office Action issued Jul. 31, 2023 in Chinese Application No. 201880050526.7.
Office Action issued Apr. 12, 2024 in Chinese Application No. 201721768740.5.
Office Action issued Feb. 2, 2024 in Chinese Application No. 202010760990.4.
Office Action issued Apr. 23, 2024 in Japanese Application No. 2023-021861.
Office Action issued Mar. 18, 2024 in Ukrainian Application No. a 2021 05048.
Office Action issued Apr. 23, 2024 in Japanese Application No. 2023-006805.
European Office Action issued Dec. 6, 2023 in Application No. 20188985.4.
Ukrainian Office Action issued Dec. 21, 2023 in Application No. a202105048.
European Office Action issued Nov. 3, 2023 in Application No. 18775504.6.
Chinese Office Action issued Dec. 27, 2023 in Application No. 202010763214.X.
Notice of Acceptance of Invalidation Request issued Nov. 3, 2022 in Chinese Application No. 201880024276.X.
Decision to Refuse issued Dec. 1, 2023 in Chinese Application No. 201880050526.7.
Notice of Acceptance of Invalidation Request issued Jan. 30, 2024 in Chinese Application No. 201721768336.8.
Chinese Office Action issued Jan. 30, 2024 in Application No. 201721768739.2.
Chinese Office Action dated Jul. 23, 2024 in Application No. 202211609705.4.
Communication dated May 21, 2024 in European Application No. 17 880 867.1.
Filipino Office Action dated Jun. 20, 2024 in Application No. 1/2020/551224.
Filipino Office Action dated Jul. 17, 2024 in Application No. 1/2019/502406.
Communication issued Oct. 22, 2024 in Japanese Application No. 2023-021861.
Communication of a notice of opposition issued in the European Patent Office on Jan. 9, 2025 in corresponding EP Patent Application No. 18805933.1.
First Office Action issued in the State Intellectual Property Office of People's Republic of China on Jan. 23, 2025 in corresponding CN Patent Application No. 202210724458.6, English Translation.
First Office Action issued in the China National Intellectual Property Administration on Mar. 21, 2025 in corresponding CN Patent Application No. 202211563176.9, English Translation.
Decision of Refusal issued in the Japanese Patent Office on Mar. 25, 2025 in corresponding JP Patent Application No. 2023-021861, English Translation.

* cited by examiner ized with some general terms currently widely used while in some cases include terms selected arbitrarily by the applicant, while considering the functions in the disclosure, are taken into consideration. Also, some terms used herein may be arbitrarily chosen by the present applicant. In this case, these terms are defined in detail below. Accordingly, the specific terms used herein should be understood based on the unique meanings thereof and the whole context of the disclosure.

AEROSOL GENERATION SYSTEM OF PREHEATING HEATER

CROSS REFERENCE TO RELATED APPLICATIONS

This application is a National Stage of International Application No. PCT/KR2018/004130 filed Apr. 9, 2018, claiming priority based on Korean Patent Application No. 10-2017-0046938 filed Apr. 11, 2017, Korean Patent Application No. 10-2017-0077586 filed Jun. 19, 2017, and Korean Patent Application No. 10-2017-0084385 filed Jul. 3, 2017.

TECHNICAL FIELD

The disclosure relates to an aerosol generation system for advance preheating of a heater.

BACKGROUND ART

Recently, there has been increasing demand for alternative ways of overcoming the disadvantages of common cigarettes. For example, demand has been increasing for a method of generating aerosol by heating an aerosol generating material in a cigarette, not a method of generating aerosol by burning the cigarette.

When an electronic tobacco device including a heater that heats a cigarette by using electricity is used, it takes time to increase the temperature of the heater to a predetermined level. Also, cigarette tar of a previously used cigarette may stain the heater and may interfere with insertion of a new cigarette.

Accordingly, research into a heating-type cigarette or a heating-type aerosol generator has been actively conducted.

DESCRIPTION OF EMBODIMENTS

Solution to Problem

Provided is an aerosol generating system including: a holder configured to generate aerosol by heating a cigarette; and a cradle having an inner space into which the holder is inserted, wherein the holder is electrically connected to the cradle and is moveable in the inner space of the cradle, and the aerosol generating system further includes: a controller; and a heater configured to heat an aerosol generating material, wherein the controller predicts insertion of the cigarette into the holder, and preheats the heater in advance based on a result of the prediction.

Advantageous Effects of Disclosure

The disclosure provides an aerosol generating system including a holder that generates aerosol by heating a cigarette, and a cradle having an inner space into which the holder is inserted.

The aerosol generating system according to the disclosure may predict insertion of a cigarette into the holder and may preheat a heater in advance based on a prediction result. Since the heater of the holder is preheated in advance, a temperature of the heater may reach a predetermined temperature when a user starts inhaling. Since the heater, the temperature of which has reached a predetermined temperature, is used, a sufficient amount of aerosol may be generated. In addition, cigarette tar attached to the heater may be flexible, and it is easy to insert the cigarette.

BEST MODE

According to an aspect of the disclosure, there is provided an aerosol generating system including: a holder configured to generate aerosol by heating a cigarette; and a cradle having an inner space into which the holder is inserted, wherein the holder is electrically connected to the cradle and is moveable in the inner space of the cradle, and the aerosol generating system further includes: a controller; and a heater configured to heat an aerosol generating material, wherein the controller predicts insertion of the cigarette into the holder, and preheats the heater in advance based on a result of the prediction.

According to another aspect of the disclosure, there is provided a method of generating aerosol by heating a cigarette in an aerosol generating system, the method including: predicting whether the cigarette is inserted into a holder; and preheating a heater of the holder in advance based on a result of the prediction.

According to another aspect of the disclosure, there is provided a computer-readable recording medium having recorded thereon a program for performing the above method on a computer.

MODE OF DISCLOSURE

With respect to the terms in the various embodiments of the present disclosure, the general terms which are currently and widely used are selected in consideration of functions of structural elements in the various embodiments of the present disclosure. However, meanings of the terms may be changed according to intention, a judicial precedent, appearance of a new technology, and the like. In addition, in certain cases, a term which is not commonly used may be selected. In such a case, the meaning of the term will be described in detail at the corresponding part in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

Hereinafter, exemplary embodiments of the present disclosure will be described in detail with reference to the accompanying drawings. The disclosure may, however, be embodied in many different forms and should not be construed as limited to the embodiments set forth herein.

Hereinafter, embodiments of the present disclosure will be described in detail with reference to the drawings.

Figure 1:
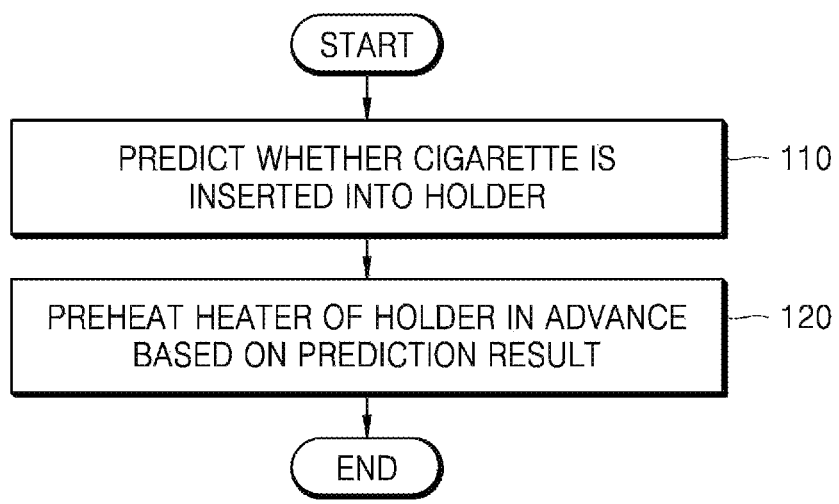
FIG. 1 is a flowchart illustrating an example of preheating a heater in advance in an aerosol generating system.

FIG. 1 is a flowchart illustrating an example of preheating a heater in advance in an aerosol generating system.

In the disclosure, an advance preheating of the heater may denote a process prior to a preheating of the heater. For example, the advance preheating of the heater may denote a process of increasing a temperature of the heater under a prediction that the cigarette is to be inserted into a holder 1 before the cigarette is actually inserted into the holder 1. In detail, when the holder 1 is tilted in an inner space of a cradle 2, when the holder 2 is separated from the inner space of the cradle 2, when a user operates an input device included in the holder 1, or before the cigarette is in contact with a side portion of the heater after insertion of the cigarette into the holder 1 is sensed, the heater of the holder 1 may be preheated in advance. The heater may be preheated in advance for a predetermined time period within a predetermined temperature range. However, the advance preheating of the heater is not limited thereto.

Referring to FIG. 1, the aerosol generating system may predict whether the cigarette is inserted into the holder in operation 110. In addition, the aerosol generating system may include the holder 1 and/or the cradle 2, and for convenience of description, it is assumed that the cradle 2 performs operations below.

In an embodiment, after the holder 1 is inserted into an inner space 230 of the cradle 2, the cradle 2 may sense a variation in a location of the holder 1. Also, the cradle 2 may predict whether the cigarette is inserted into the holder 1 based on the sensed variation in the location of the holder 1.

In detail, the cradle 2 may sense tilting of the holder 1 after the holder 1 is inserted into the inner space 230 of the cradle 2, in order to sense the variation in the location of the holder 1. Also, the cradle 2 may sense separating of the holder 1 from the inner space 230 of the cradle 2, in order to sense the variation in the location of the holder 1.

In operation 110, the operation of the cradle 2 for sensing the variation in the location of the holder 1 may be performed by the holder 1.

In operation 120, the aerosol generating system may preheat the heater of the holder 1 in advance, based on a prediction result in operation 110.

In an embodiment, after the holder 1 is inserted into the inner space 230 of the cradle 2, the holder 1 or the cradle 2 senses that the location of the holder 1 is changed by a predetermined threshold value or greater and predicts that the cigarette is to be inserted into the holder 1, and then, the heater of the holder 1 may be preheated in advance.

In detail, in a state in which the holder 1 is coupled to the cradle 2, the cradle 2 senses that the holder 1 is tilted at a predetermined threshold angle or greater and predicts that the cigarette is to be inserted into the holder 1, and the heater of the holder 1 may be preheated in advance. Also, the cradle 2 may predict that the cigarette is to be inserted into the holder 1 by sensing the separation of the holder 1 from the cradle 2, and then, the heater of the holder 1 may be preheated in advance.

In addition, in operation 120, the operation of the cradle 2 for preheating the heater of the holder 1 in advance may be performed by the holder 1.

In another embodiment, the holder 1 may include at least one input device that may control functions of the holder 1. The holder 1 may predict whether the cigarette is to be inserted into the holder 1 by using the at least one input device. Also, when the holder 1 receives an input through the at least one input device, the heater of the holder 1 may be preheated in advance.

In another embodiment, the holder 1 may include a cigarette insertion sensor. The holder 1 senses that the cigarette is inserted into the holder 1 by using the cigarette insertion sensor, and may preheat the heater of the holder 1 in advance before the cigarette is in contact with the side portion of the heater.

Figure 2:
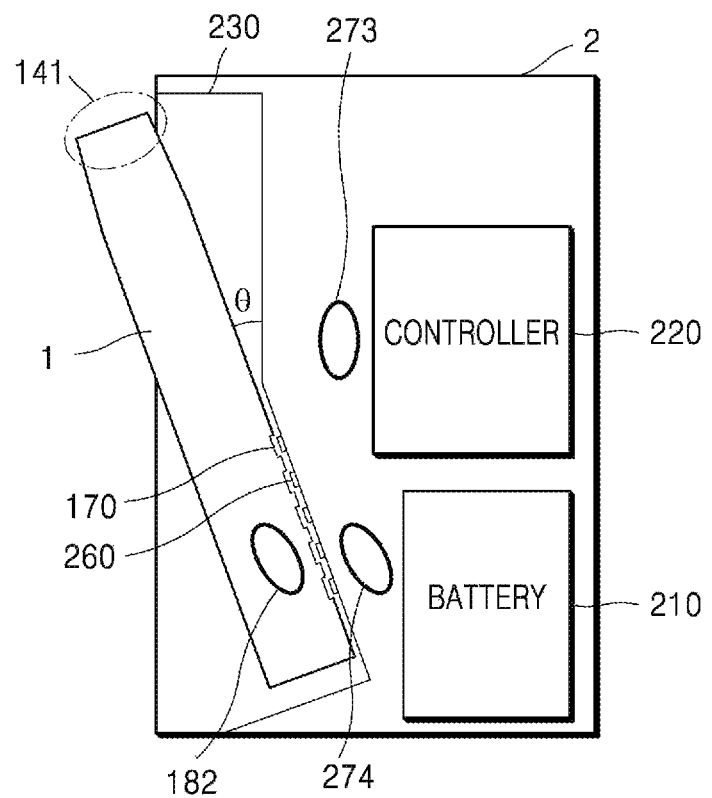
FIG. 2 is a diagram showing an example in which a holder is tilted while coupled to a cradle.

FIG. 2 is a diagram showing an example, in which a holder is tilted in a state of being coupled to a cradle.

Referring to FIG. 2, the holder 1 may include an attaching member 182 at a first position and the cradle 2 may include attaching members 273 and 274 at a second position and a third position. In this case, the first position and the third position may be positions facing each other when the holder 1 is inserted into the cradle 2.

Also, the holder 1 may include a terminal 170 and the cradle 2 may include a terminal 260. When the terminal 170 of the holder 1 is in contact with the terminal 260 of the cradle 2, the holder 1 is coupled to and electrically connected to the cradle 2.

Referring to FIG. 2, the holder 1 is tilted in the cradle 2. Here, the term 'tilting' indicates that the holder 1 is inclined at a certain angle in a state while the holder 1 is being inserted into the cradle 2. For example, the range of the tilting angle θ may be greater than 0° and not greater than 180° and may preferably be not less than 10° and not greater than 90°.

The cradle 2 may sense that the holder 1 is tilted in the cradle 2.

In an embodiment, in a state in which the holder 1 is partially or entirely included (or inserted) in the inner space 230 of the cradle 2, a sensor of the cradle 2 may measure the tilting angle θ indicating a tilted degree of the holder 1 to sense the tilting of the holder 1. In addition, that the holder 1 is included in the inner space 230 of the cradle 2 may denote a state in which the terminal 170 of the holder 1 is in contact with the terminal 260 of the cradle 2, but is not limited thereto.

Also, the sensor of the cradle 2 may sense that the holder 1 is tilted by measuring a time during which the holder 1 is separated from the attaching member 273 at the second position in a state in which the attaching member 182 at the first position and the attaching member 274 at the third position are coupled to each other. However, a method of sensing the tilting of the holder 1 is not limited to the above examples.

The tilting of the holder 1 in the cradle 2 may be sensed by a sensor (not shown) of the holder 1.

When the tilting of the holder 1 in the cradle 2 is sensed, the cradle 2 may predict the insertion of the cigarette into the holder 1.

In an embodiment, when a controller 220 of the cradle 2 determines that the tilting angle θ of the holder 1 is equal to or greater than a predetermined angle in a state in which the holder 1 is included in the inner space 230 of the cradle 2, the insertion of the cigarette into the holder 1 may be predicted. For example, the controller 220 of the cradle 2 may predict the insertion of the cigarette into the holder 1 by determining that the tilting angle θ of the holder 1 is equal to or greater than 5°, 10°, 15°, 30°, 45°, 60°, or 75°.

In addition, in a state in which the attaching member 182 at the first position and the attaching member 274 at the third position are coupled to each other, the controller 220 of the cradle 2 may determine that the holder 1 is separated from the attaching member 273 at the second position for a predetermined time period or longer, and then, may predict the insertion of the cigarette into the holder 1. For example, when the controller 220 of the cradle 2 determines that the holder 1 is separated from the attaching member 273 at the second position for 0.2 sec., 0.5 sec., 1 sec., 1.5 sec., or longer, the insertion of the cigarette into the holder 1 may be predicted.

The operation of predicting the insertion of the cigarette into the holder 1 may be performed by a controller 120 of the holder 1.

Since the insertion of the cigarette into the holder 1 may be predicted, the heater of the holder 1 may be preheated in advance.

In an embodiment, a battery 210 of the cradle 2 may be used to preheat the heater of the holder 1 in advance. Even when the holder 1 is tilted in the cradle 2, since the terminal 170 of the holder 1 and the terminal 260 of the cradle 2 are in contact with each other, the battery 210 of the cradle 2 may be used to preheat the heater of the holder 1 in advance. Also, a battery 110 of the holder 1 may be used to preheat the heater of the holder 1 in advance.

For example, the heater of the holder 1 may be preheated in advance by the electric power supplied by the battery 210 of the cradle 2. Also, the battery 110 of the holder 1 may be charged by the electric power supplied from the battery 210 of the cradle 2, and then, the heater of the holder 1 may be preheated in advance by the electric power supplied by the battery 110 of the holder 1. In addition, the battery 210 of the cradle 2 supplies electric power to the heater of the holder 1 for the advance preheating, and supplied electric power to the battery 110 of the holder 1 for charging the battery 110. The controller 220 of the cradle 2 or the controller 120 of the holder 1 may use the battery 110 of the holder 1 to preheat the heater of the holder 1 in advance. However, the method of using the battery 210 of the cradle 2 and the battery 110 of the holder 1 for preheating the heater of the holder 1 in advance is not limited to the above example.

Figure 3:
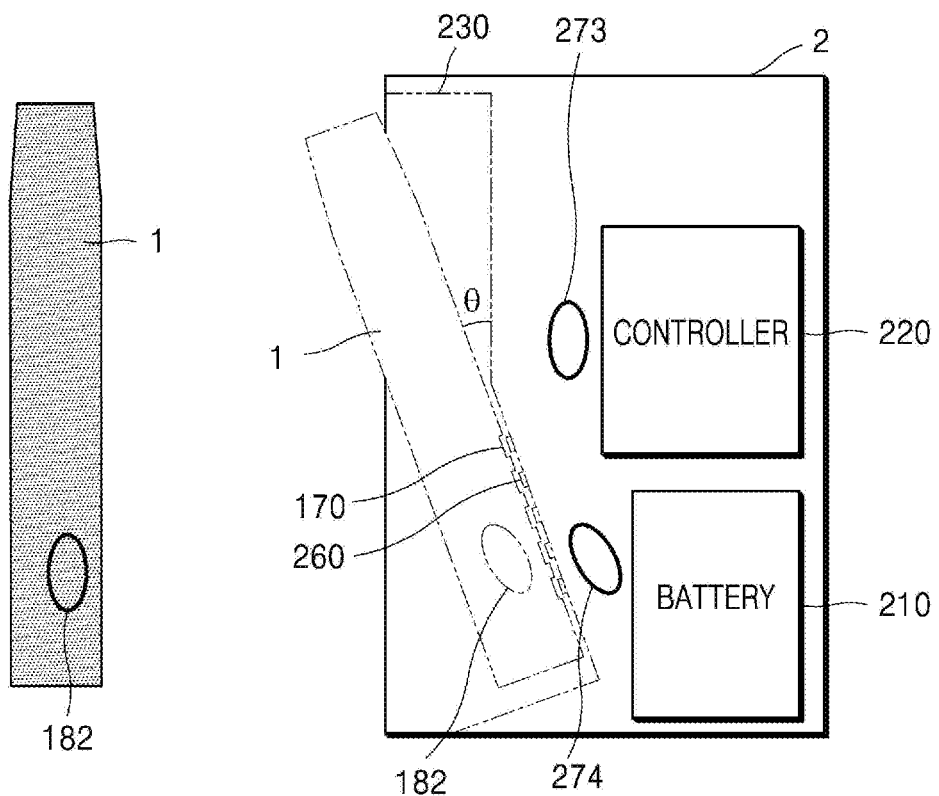
FIG. 3 is a diagram showing an example of separating a holder from a cradle.

FIG. 3 is a diagram showing an example of separating a holder from a cradle.

Referring to FIG. 3, a process of separating the holder 1 from the cradle 2 is shown. In an embodiment, the holder 1 may be tilted in the cradle 2 and then separated from the cradle 2. Alternatively, the holder 1 may be popped-up and separated from the cradle 2 by an input device in the holder 1 or the cradle 2, without being tilted in the cradle 2.

Descriptions provided above with reference to FIG. 2 are also applied to FIG. 3 even when being omitted.

The cradle 2 may sense separation of the holder 1 from the cradle 2.

In an embodiment, in a state in which the holder 1 is included in the inner space 230 of the cradle 2, the sensor of the cradle 2 measures the tilting angle θ indicating a tilted degree of the holder 1 to sense the holder 1 separating from the cradle 2. Also, the sensor may measure a time period taken for the attaching member 182 at the first position and the attaching member 274 at the third position that are coupled to each other to be separated from each other, and thus may sense the holder 1 separating from the cradle 2. However, a method of sensing the holder 1 separating from the cradle 2 is not limited to the above examples.

In addition, separation of the holder 1 from the cradle 2 may be sensed by a sensor (not shown) of the holder 1.

When the separation of the holder 1 from the cradle 2 is sensed, the cradle 2 may predict the insertion of the cigarette into the holder 1.

In an embodiment, the controller 220 of the cradle 2 may determine that the holder 1 is separated from the inside of the cradle 2 by determining whether the tilting angle θ of the holder 1 is equal to or greater than a predetermined angle, and then may predict insertion of the cigarette into the holder 1. For example, the controller 220 of the cradle 2 may determine that the holder 1 is separated from the inside of the cradle 2 by determining whether the tilting angle θ of the holder 1 is equal to or greater than 5°, 10°, 15°, 30°, 45°, 60°, 75°, or 80°.

Also, the controller 220 of the cradle 2 may predict that the cigarette is to be inserted into the holder 1 by determining that the attaching member 182 at the first position and the attaching member 274 at the third position are separated from each other for a predetermined time period (e.g., 0.3 sec., 0.5 sec., etc.) For example, the controller 220 may predict that the cigarette is to be inserted into the holder 1 by determining whether the attaching member 182 at the first position and the attaching member 274 at the third position are separated from each other for 1 sec., 1.5 sec., or longer.

The operation of predicting the insertion of the cigarette into the holder 1 may be performed by a controller 120 of the holder 1.

Since the insertion of the cigarette into the holder 1 may be predicted, the heater of the holder 1 may be preheated in advance.

In an embodiment, the battery 110 of the holder 1 may be used to preheat the heater of the holder 1 in advance. For example, the heater of the holder 1 may be preheated in advance by the electric power supplied by the battery 110 of the holder 1.

Figure 4A:
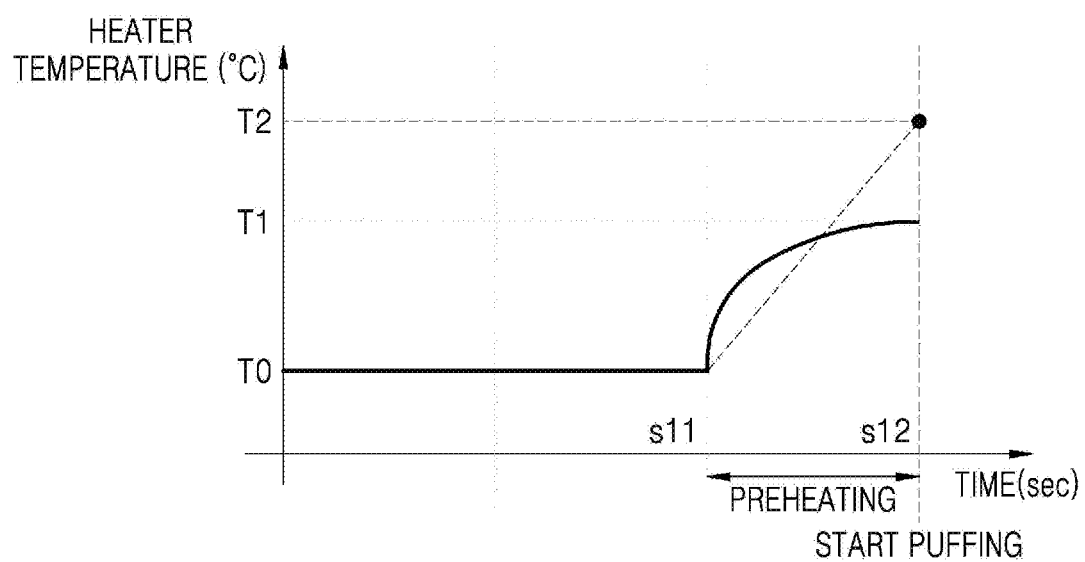
FIGS. 4A and 4B are graphs showing temperature variation of a heater according to advance preheating or preheating.
Figure 4B:
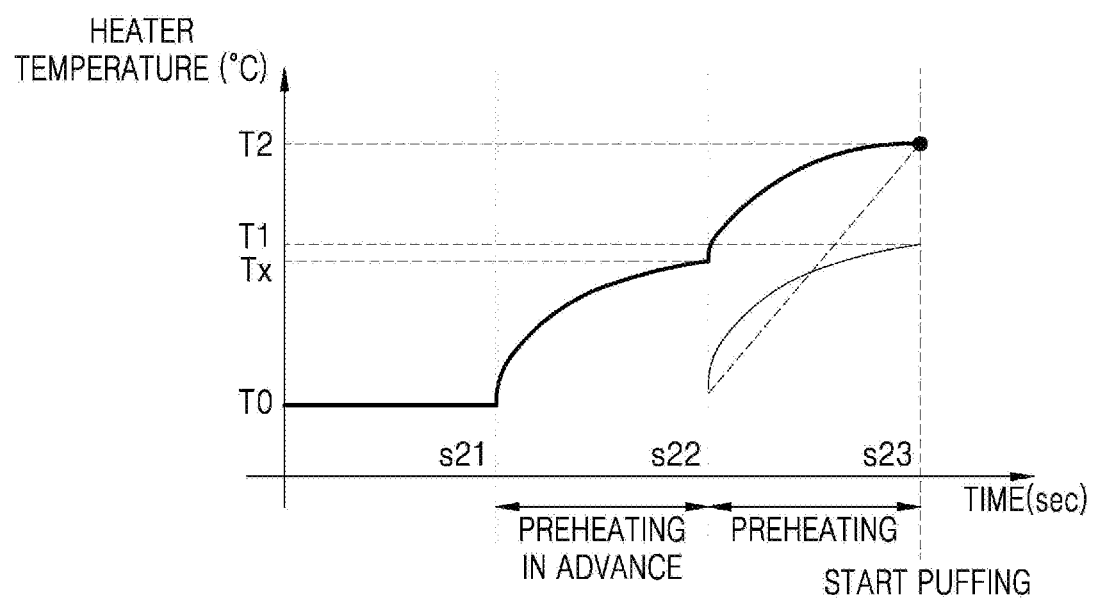

FIGS. 4A and 4B are graphs showing a temperature variation of a heater according to advance preheating or pre-heating.

FIG. 4A shows an exemplary graph showing a heater temperature according to time, when the heater of the holder 1 is preheated without advance preheating. In an embodiment, when the input device of the holder 1 is operated after the cigarette is inserted into the holder 1, a user input is received and the heater of the holder 1 may be preheated.

Referring to FIG. 4A, T0 denotes a heater temperature (e.g., 15° C., 20° C., 25° C., etc.) at room temperature before preheating the heater. Also, T2 denotes a desirable heater temperature (e.g., 400° C., 500° C., 600° C., etc.) at a time when a user starts puffing (s12).

The heater of the holder 1 may be preheated from s11 to s12. The preheating time (s11 to s12) may be 0.5 sec., 1 sec., 1.5 sec., 2 sec., etc. A controller of the holder 1 may control the heater temperature in such a manner as ON/OFF control, proportional control, integral control, differential control, PID control, etc. According to the ON/OFF control method, operations may be performed simply, but overshoot and hunting may occur. According to the proportional control method, overshoot and hunting less occur, but it may take a long time period to stabilize.

For example, when the heater temperature is controlled by the proportional control method and there is not a sufficient time period (s11 to s12) to preheat the heater, a heater temperature T1 at the time when the user starts puffing (s12) may be lower than T2.

FIG. 4B shows an exemplary graph showing a heater temperature according to time, when the heater of the holder 1 is preheated after the advance preheating.

Referring to FIG. 4B, T0 denotes a heater temperature (e.g., 15° C., 20° C., 25° C., etc.) at room temperature before preheating the heater. Also, T2 denotes a desirable heater temperature (e.g., 400° C., 500° C., 600° C., etc.) at a time when a user starts puffing (s12).

The heater of the holder 1 is preheated in advance from s21 to s22, and the heater temperature may reach Tx. The controller of the holder 1 may preheat the heater in advance to a preset temperature Tx. For example, the controller of the holder 1 may preheat the heater in advance within a range of 100° C. to 350° C. Also, the controller of the holder 1 may preheat the heater in advance for a preset time period (s21 to s22). For example, the controller of the holder 1 may preheat the heater in advance for 1 to 3 sec.

The heater of the holder 1 is preheated in advance from s21 to s22, and then may be preheated from s22 to s23. Even when there is not a sufficient time period (s22 to s23) for preheating the heater, the heater temperature may reach T2 at the time (s23) when the user starts puffing. Since the heater of the holder 1 is preheated in advance, the heater temperature may reach T2 at the time (s23) when the user starts puffing, and accordingly, a sufficient amount of aerosol may be generated. Also, since the heater of the holder 1 is preheated in advance, cigarette tar, etc. attached to the heater may become soft and it may be easy to insert the cigarette.

Figure 5:
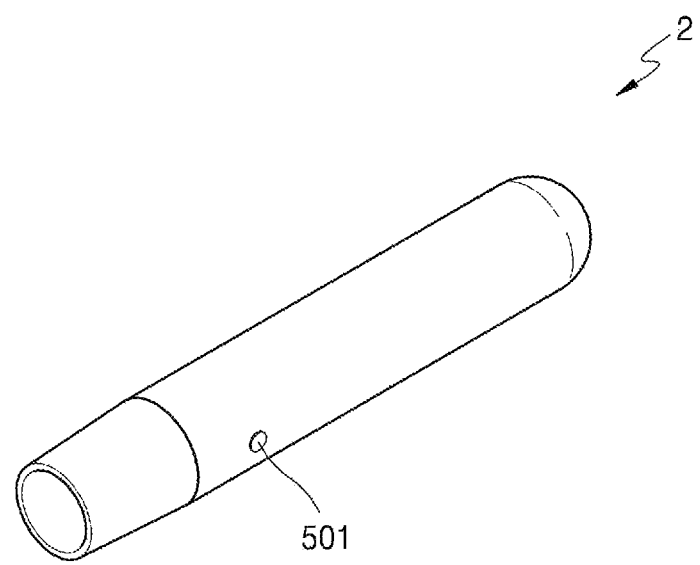
FIG. 5 is a diagram showing an example of a holder including an input device.

FIG. 5 is a diagram showing an example of a holder including an input device.

Referring to FIG. 5, the holder 1 may include at least one input device 501 (e.g., a button) through which the user may control functions of the holder 1.

For example, a user may perform various functions by using the input device 501 of the holder 1. By adjusting the number of times a user presses the input device 501 (e.g., once, twice, etc.) or the time during which the input device 501 is being pressed (e.g., 0.1 second, 0.2 second, etc.), a desired function from among a plurality of functions of the holder 1 may be executed.

In an embodiment, when the user operates the input device 501, the holder 1 may perform a function of advance preheating the heater. For example, when the user presses the input device 501 for 1 to 2 sec., the holder 1 may preheat the heater in advance for a predetermined time period (e.g., 1 to 3 sec.) at a predetermined temperature (e.g., a range from 100° C. to 350° C.).

In addition, in an embodiment, the input device may be included in the cradle 2, and in a state in which the holder 1 and the cradle 2 are electrically connected to each other, the heater of the holder 1 may be preheated in advance by using the input device of the cradle 2.

Figure 6:
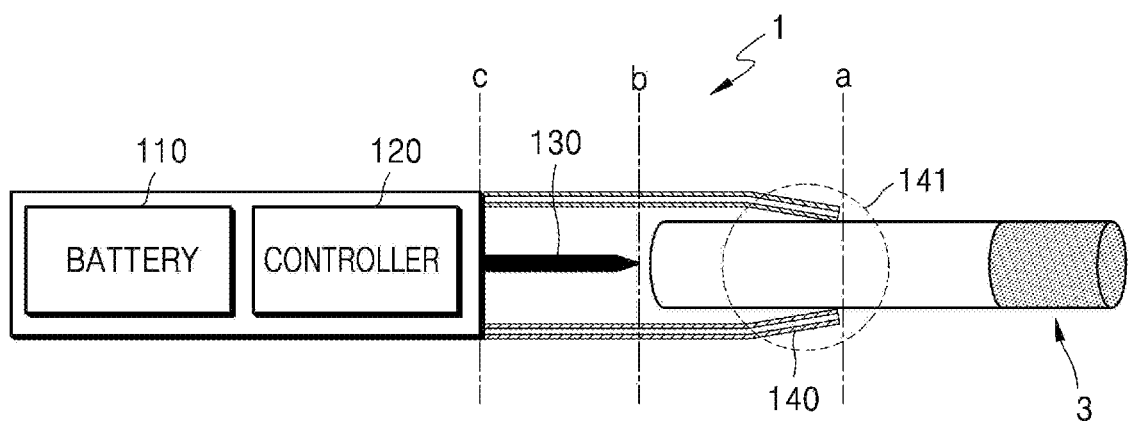
FIG. 6 is a diagram showing an example of inserting a cigarette into a holder.

FIG. 6 is a diagram showing an example of inserting a cigarette into a holder.

Referring to FIG. 6, the cigarette 3 may be inserted into the holder 1 through the terminal end 141 of the casing 140. When the cigarette 3 is inserted into the holder 1, the heater 130 is located inside the cigarette 3. Therefore, the heated heater 130 heats the aerosol generating material of the cigarette 3, thereby generating aerosol.

The holder 1 may include a cigarette insertion detecting sensor. The cigarette insertion detecting sensor may be implemented by a common capacitive sensor or a resistance sensor. In an embodiment, the cigarette insertion detecting sensor may sense whether the cigarette 3 is inserted from a position a of the holder 1. Also, the cigarette insertion detecting sensor may sense whether the cigarette 3 inserted in the holder 1 is in contact with a side of the heater 130 at a position b or a position c.

The holder 1 senses that the cigarette 3 is inserted from the position a of the holder 1 by using the cigarette insertion detecting sensor, and then, the controller 120 of the holder 1 may supply electric power of the battery 110 to the heater 130 to preheat the heater 130 in advance until the cigarette 3 touching the heater 130 at the position b or position c is sensed.

In addition, embodiments illustrated in FIGS. 7 to 19 below show modified examples of an aerosol generating system that may be applied to the aerosol generating system according to the embodiments illustrated with reference to FIGS. 1 to 6 above.

Figure 7:
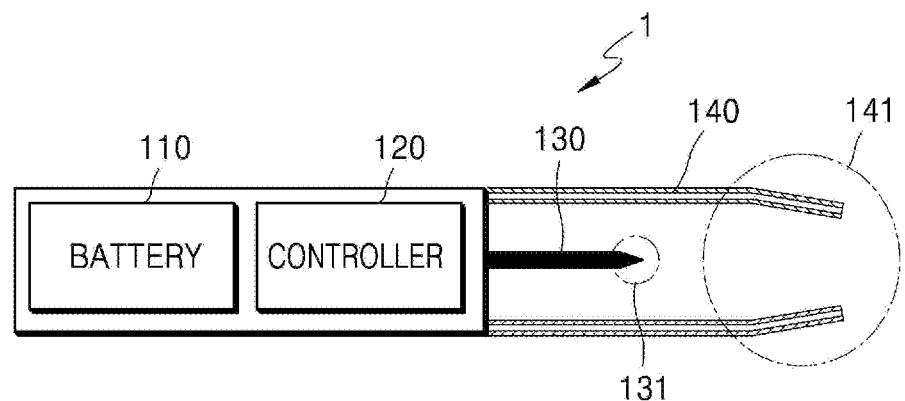
FIG. 7 is a diagram showing an example of an aerosol generating apparatus.

FIG. 7 is a diagram showing an example of an aerosol generating apparatus.

Referring to FIG. 7, the holder 1 includes the battery 110, the controller 120, and the heater 130. The holder 1 also includes an inner space formed by a casing 140. A cigarette may be inserted into the inner space of the holder 1.

Only components associated with the present embodiment are shown in the holder 1 shown in FIG. 7. Therefore, it will be understood by one of ordinary skill in the art that general components other than the components shown in FIG. 7 may be further included in the holder 1.

When a cigarette is inserted into the holder 1, the holder 1 heats the heater 130. The temperature of an aerosol generating material in the cigarette is raised by the heated heater 130, and thus aerosol is generated. The generated aerosol is delivered to a user through a cigarette filter. However, even when a cigarette is not inserted into the holder 1, the holder 1 may heat the heater 130.

The casing 140 may be detached from the holder 1. For example, when a user rotates the casing 140 clockwise or counterclockwise, the casing 140 may be detached from the holder 1.

The diameter of a hole formed by a terminal end 141 of the casing 140 may be smaller than the diameter of a space formed by the casing 140 and the heater 130. In this case, the hole may serve as a guide for a cigarette inserted into the holder 1.

The battery 110 supplies power used for the holder 1 to operate. For example, the battery 110 may supply power for heating the heater 130 and supply power for operating the controller 120. In addition, the battery 110 may supply power for operating a display, a sensor, a motor, and the like installed in the holder 1.

The battery 110 may be a lithium iron phosphate (LiFePO$_4$) battery, but is not limited to the example described above. For example, the battery 110 may be a lithium cobalt oxide (LiCoO$_2$) battery, a lithium titanate battery, etc.

Also, the battery 110 may have a cylindrical shape having a diameter of 10 mm and a length of 37 mm, but is not limited thereto. The capacity of the battery 110 may be 120 mAh or more, and the battery 110 may be a rechargeable battery or a disposable battery. For example, when the battery 110 is rechargeable, the charging rate (C-rate) of the battery 110 may be 10 C and the discharging rate (C-rate) may be 16 C to 20 C. However, the present disclosure is not limited thereto. Also, for stable use, the battery 110 may be manufactured, such that 80% or more of the total capacity may be ensured even when charging/discharging are performed 8000 times.

Here, it may be determined whether the battery 110 is fully charged or completely discharged based on a level of power stored in the battery 110 as compared to the entire capacity of the battery 110. For example, when power stored in the battery 110 is equal to or more than 95% of the total capacity, it may be determined that the battery 110 is fully charged. Furthermore, when power stored in the battery 110 is 10% or less of the total capacity, it may be determined that the battery 110 is completely discharged. However, the criteria for determining whether the battery 110 is fully charged or completely discharged are not limited to the above examples.

The heater 130 is heated by power supplied from the battery 110. When a cigarette is inserted into the holder 1, the heater 130 is located inside the cigarette. Therefore, the heated heater 130 may raise the temperature of an aerosol generating material in the cigarette.

The shape of the heater 130 may be a combination of a cylindrical shape and a conical shape. For example, the heater 130 may have a cylindrical shape having a diameter of about 2 mm and a length of about 23 mm, and a terminal end 131 of the heater 130 may have an acute angle, but one or more embodiments are not limited thereto. In other words, the heater 130 may have any shape as long as the heater 130 may be inserted into the cigarette. In addition, only a portion of the heater 130 may be heated. For example, assuming that the length of the heater 130 is 23 mm, only 12 mm from the terminal end 131 of the heater 130 may be heated, and the remaining portion of the heater 130 may not be heated.

The heater 130 may be an electro-resistive heater. For example, the heater 130 includes an electrically conductive track, and the heater 130 may be heated as a current flows through the electrically conductive track.

For stable use, the heater 130 may be supplied with power according to the specifications of 3.2 V, 2.4 A, and 8 W, but is not limited thereto. For example, when power is supplied to the heater 130, the surface temperature of the heater 130 may rise to 400° C. or higher. The surface temperature of the heater 130 may rise to about 350° C. before 15 seconds after the power supply to the heater 130 starts.

The holder 1 may be provided with a separate temperature sensor. Alternatively, the holder 1 may not be provided with a temperature sensing sensor, and the heater 130 may serve as a temperature sensing sensor. For example, the heater 130 may further include a second electrically conductive track for temperature sensing in addition to the first electrically conductive track for generating heat.

For example, when a voltage applied to the second electrically conductive track and a current flowing through the second electrically conductive track are measured, a resistance R may be determined. At this time, a temperature T of the second electrically conductive track may be determined by Equation 1 below.

$$R = R_0(1 + \alpha(T - T_0)) \quad \text{[Equation 1]}$$

In Equation 1, R denotes a current resistance value of the second electrically conductive track, $R_0$ denotes a resistance value at a temperature $T_0$ (e.g., 0° C.), and $\alpha$ denotes a resistance temperature coefficient of the second electrically conductive track. Since conductive materials (e.g., metals) have inherent resistance temperature coefficients, $\alpha$ may be determined in advance according to a conductive material constituting the second electrically conductive track. Therefore, when the resistance R of the second electrically conductive track is determined, the temperature T of the second electrically conductive track may be calculated according to Equation 1.

The heater 130 may include at least one electrically conductive track (a first electrically conductive track and a second electrically conductive track). For example, the heater 130 may include, but is not limited to, two first electrically conductive tracks and one or two second electrically conductive tracks.

An electrically conductive track includes an electro-resistive material. For example, an electrically conductive track may include a metal. In another example, an electrically conductive track may include an electrically conductive ceramic material, a carbon, a metal alloy, or a composite of a ceramic material and a metal.

In addition, the holder 1 may include both an electrically conductive track, which serves as a temperature sensing sensor, and a temperature sensing sensor.

The controller 120 controls the overall operation of the holder 1. Specifically, the controller 120 controls not only operations of the battery 110 and the heater 130, but also operations of other components included in the holder 1. The controller 120 may also check the status of each of the components of the holder 1 and determine whether the holder 1 is in an operable state.

The controller 120 includes at least one processor. A processor may be implemented as an array of a plurality of logic gates or may be implemented as a combination of a general purpose microprocessor and a memory in which a program executable in the microprocessor is stored. It will be understood by one of ordinary skill in the art that the present disclosure may be implemented in other forms of hardware.

For example, the controller 120 may control the operation of the heater 130. The controller 120 may control an amount of power supplied to the heater 130 and a time for supplying the power, such that the heater 130 may be heated to a predetermined temperature or maintained at a proper temperature. The controller 120 may also check the status of the battery 110 (e.g., the remaining amount of the battery 110) and generate a notification signal as occasions demand.

Also, the controller 120 may check the presence or absence of a user's puff, check the strength of the puff, and count the number of puffs. Also, the controller 120 may continuously check the time during which the holder 1 is operating. The controller 120 may also check whether a cradle 2 to be described below is coupled with the holder 1 and control the operation of the holder 1 based on whether the cradle 2 is coupled with or separated from and the holder 1.

Meanwhile, the holder 1 may further include general-purpose components other than the battery 110, the controller 120, and the heater 130.

For example, the holder 1 may include a display capable of outputting visual information or a motor for outputting tactile information. For example, when a display is included in the holder 1, the controller 120 may provide a user information about the state of the holder 1 (e.g., availability of the holder, etc.), information about the heater 130 (e.g., start of preheating, progress of preheating, completion of preheating, etc.), information about the battery 110 (e.g., remaining power of the battery 110, availability, etc.), information about resetting of the holder 1 (e.g., reset timing, reset progress, reset completion, etc.), information about cleaning of the holder 1 (e.g., cleaning timing, cleaning progress, cleaning completion, etc.), information about charging of the holder 1 (e.g., need of charging, charging progress, charging completed, etc.), information about puff (e.g., the number of puffs, notification of expected completion of puffs, etc.), or information about safety (e.g., time of use, etc.) via the display. In another example, when a motor is included in the holder 1, the controller 120 may transmit the above-described information to a user by generating a vibration signal by using the motor.

The holder 1 may also include a terminal coupled with at least one input device (e.g., a button) and/or the cradle 2 through which a user may control the function of the holder 1. For example, a user may perform various functions by using the input device of the holder 1. By adjusting the number of times a user presses the input device (e.g., once, twice, etc.) or the time during which the input device is being pressed (e.g., 0.1 sec., 0.2 sec., etc.), a desired function from among a plurality of functions of the holder 1 may be executed. As a user manipulates the input device, the holder 1 may perform a function of preheating the heater 130, a function of regulating the temperature of the heater 130, a function of cleaning the space in which a cigarette is inserted, a function of checking whether the battery 110 is in an operable state, a function of displaying the remaining power (available power) of the battery 110, a function of resetting the holder 1, etc. However, the functions of the holder 1 are not limited to the examples described above.

The holder 1 may also include a puff detecting sensor, a temperature sensing sensor, and/or a cigarette insertion detecting sensor. For example, the puff detecting sensor may be implemented by using a general pressure sensor, and the cigarette insertion detecting sensor may include a general capacitive sensor or a resistance sensor. Also, the holder 1 may be fabricated to have a structure in which the outside air may flow in/out even in the state where the cigarette is inserted.

Figure 8A:
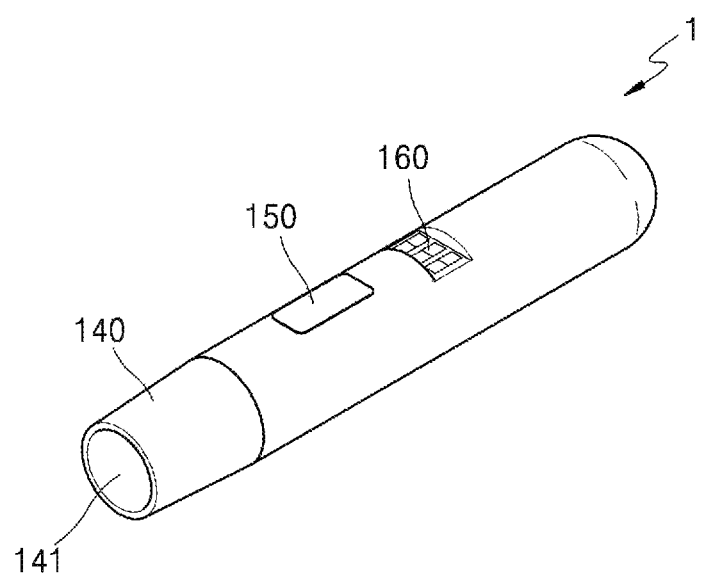
FIGS. 8A and 8B are diagrams showing various views of an example of a holder.
Figure 8B:
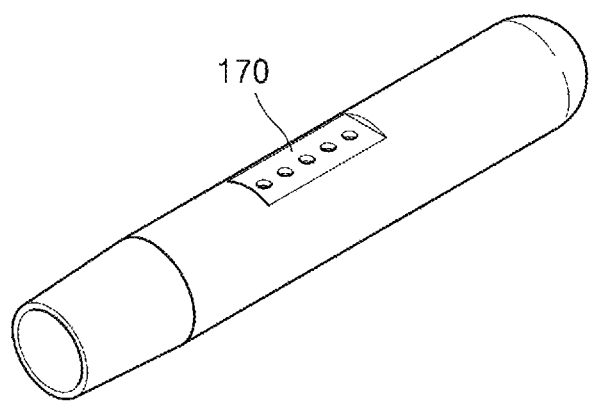

FIGS. 8A and 8B are diagrams showing various views of an example of a holder.

FIG. 8A is a diagram showing an example of the holder 1 viewed in a first direction. As shown in FIG. 8A, the holder 1 may be fabricated to have a cylindrical shape, but the present disclosure is not limited thereto. The casing 140 of the holder 1 may be separated by an action of a user and a cigarette may be inserted into a terminal end 141 of the casing 140. The holder 1 may also include a button 150 for a user to control the holder 1 and a display 160 for outputting an image.

FIG. 8B is a diagram showing an example of the holder 1 viewed in a second direction. The holder 1 may include a terminal 170 coupled with the cradle 2. As the terminal 170 of the holder 1 is coupled with a terminal 260 of the cradle 2, the battery 110 of the holder 1 may be charged by power supplied by a battery 210 of the cradle 2. Also, the holder 1 may be operated by power supplied from the battery 210 of the cradle 2 through the terminal 170 and the terminal 260 and a communication (transmission/reception of signals) may be performed between the holder 1 and the cradle 2 through the terminal 170 and the terminal 260. For example, the terminal 170 may include four micro pins, but the present disclosure is not limited thereto.

Figure 9:
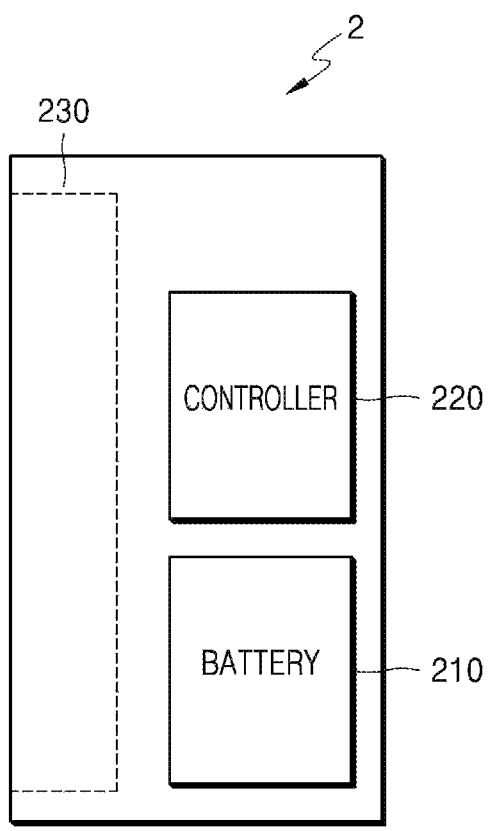
FIG. 9 is a diagram showing an example configuration of a cradle.

FIG. 9 is a diagram showing an example configuration of a cradle.

Referring to FIG. 9, the cradle 2 includes the battery 210 and a controller 220. The cradle 2 also includes an inner space 230 into which the holder 1 may be inserted. For example, the inner space 230 may be formed on one side of the cradle 2. Therefore, the holder 1 may be inserted and fixed in the cradle 2 even when the cradle 2 does not include a separate lid.

Only components of the cradle 2 related to the present embodiment are shown in FIG. 9. Therefore, it will be understood by one of ordinary skill in the art that general-purpose components other than the components shown in FIG. 9 may be further included in the cradle 2.

The battery 210 provides power used to operate the cradle 2. In addition, the battery 210 may supply power for charging the battery 110 of the holder 1. For example, when the holder 1 is inserted into the cradle 2 and the terminal 170 of the holder 1 is coupled with the terminal 260 of the cradle 2, the battery 210 of the cradle 2 may supply power to the battery 110 of the holder 1.

Also, when the holder 1 is coupled with the cradle 2, the battery 210 may supply power used for the holder 1 to operate. For example, when the terminal 170 of the holder 1 is coupled with the terminal 260 of the cradle 2, the holder 1 may operate by using power supplied by the battery 210 of the cradle 2 regardless of whether the battery 110 of the holder 1 is discharged or not.

Examples of the battery 210 may be the same as those of the battery 110 described above with reference to FIG. 7. The capacity of the battery 210 may be greater than the capacity of the battery 110. For example, the capacity of the battery 210 may be, but is not limited to, 3000 mAh or greater.

The controller 220 generally controls the overall operation of the cradle 2. The controller 220 may control the overall operation of all the configurations of the cradle 2. The controller 220 may also determine whether the holder 1 is coupled with the cradle 2 and control the operation of the cradle 2 according to coupling or separation of the cradle 2 and the holder 1.

For example, when the holder 1 is coupled with the cradle 2, the controller 220 may supply power of the battery 210 to the holder 1, thereby charging the battery 110 or heating the heater 130. Therefore, even when remaining power of the battery 110 is low, a user may continuously smoke by coupling the holder 1 with the cradle 2.

The controller 220 includes at least one processor. A processor may be implemented as an array of a plurality of logic gates or may be implemented as a combination of a general purpose microprocessor and a memory in which a program executable in the microprocessor is stored. It will be understood by one of ordinary skill in the art that the present disclosure may be implemented in other forms of hardware.

Meanwhile, the cradle 2 may further include general-purpose components other than the battery 210 and the controller 220. For example, cradle 2 may include a display capable of outputting visual information. For example, when the cradle 2 includes a display, the controller 220 generates a signal to be displayed on the display, thereby informing a user information regarding the battery 210 (e.g., the remaining power of the battery 210, availability of the battery 210, etc.), information regarding resetting of the cradle 2 (e.g., reset timing, reset progress, reset completion, etc.), information regarding cleaning of the holder 1 (e.g., cleaning timing, cleaning necessity, cleaning progress, cleaning completion, etc.), information regarding charging of the cradle 2 (e.g., charging necessity, charging progress, charging completion, etc.).

The cradle 2 may also include at least one input device (e.g., a button) for a user to control the function of the cradle 2, a terminal 260 to be coupled with the holder 1, and/or an interface for charging the battery 210 (e.g., an USB port, etc.).

For example, a user may perform various functions by using the input device of the cradle 2. By controlling the number of times that a user presses the input device or a period of time for which the input device is pressed, a desired function from among the plurality of functions of the cradle 2 may be executed. As a user manipulates the input device, the cradle 2 may perform a function of preheating the heater 130, a function of regulating the temperature of the heater 130, a function of cleaning the space in which a cigarette is inserted, a function of checking whether the cradle 2 is in an operable state, a function of displaying the remaining power (available power) of the battery 210 of the cradle 2, a function of resetting the cradle 2, etc. However, the functions of the cradle 2 are not limited to the examples described above.

Figure 10A:
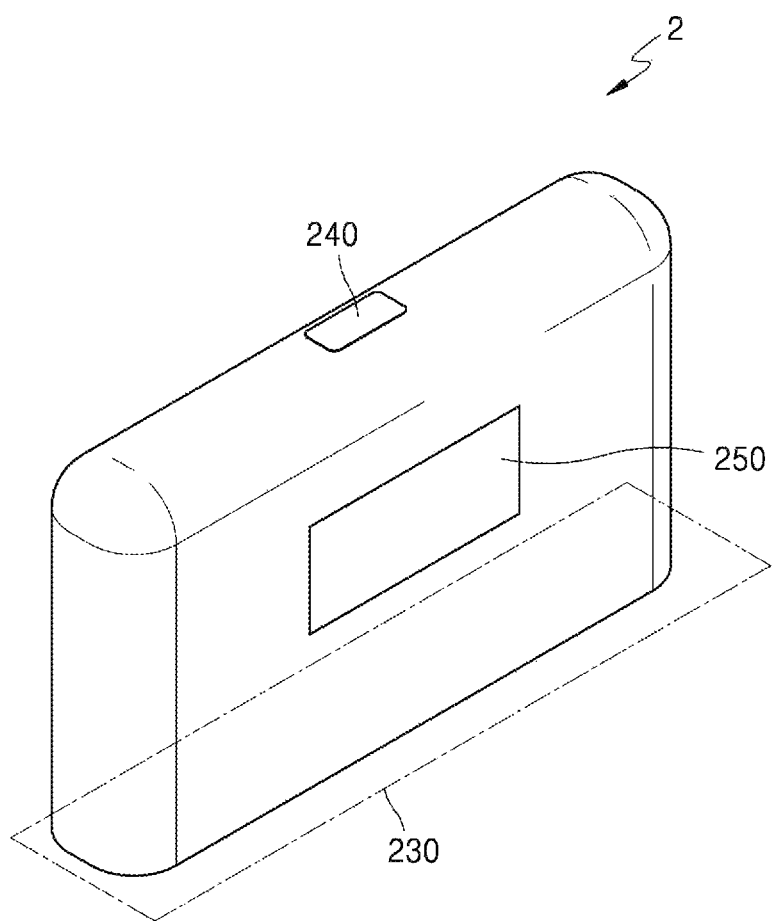
FIGS. 10A and 10B are diagrams showing various views of an example of a cradle.
Figure 10B:
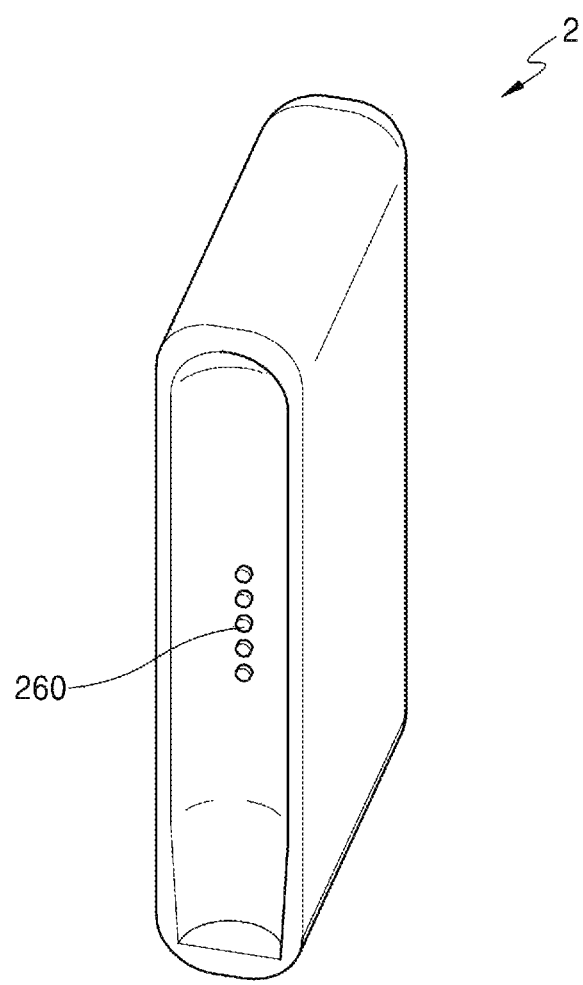

FIGS. 10A and 10B are diagrams showing various views of an example of a cradle.

FIG. 10A is a diagram showing an example of the cradle 2 viewed in a first direction. The inner space 230 into which the holder 1 may be inserted may be formed on one side of the cradle 2. Also, the holder 1 may be inserted and fixed in the cradle 2 even when the cradle 2 does not include a separate fixing unit like a lid. The cradle 2 may also include a button 240 for a user to control the cradle 2 and a display 250 for outputting an image.

FIG. 10B is a diagram showing an example of the cradle 2 viewed in a second direction. The cradle 2 may include a terminal 260 to be coupled with the inserted holder 1. The battery 110 of the holder 1 may be charged by power supplied by the battery 210 of the cradle 2 as the terminal 260 is coupled with the terminal 170 of the holder 1. Also, the holder 1 may be operated by power supplied from the battery 210 of the cradle 2 through the terminal 170 and the terminal 260 and transmission/reception of signals may be performed between the holder 1 and the cradle 2 through the terminal 170 and the terminal 260. For example, the terminal 260 may include four micro pins, but the present disclosure is not limited thereto.

The holder 1 may be inserted into the inner space 230 of the cradle 2, as described above with reference to FIGS. 7 to 10B. The holder 1 may be completely inserted into the cradle 2 or may be tilted while being inserted into the cradle 2. Hereinafter, examples in which the holder 1 is inserted into the cradle 2 will be described with reference to FIGS. 11 to 13B.

Figure 11:
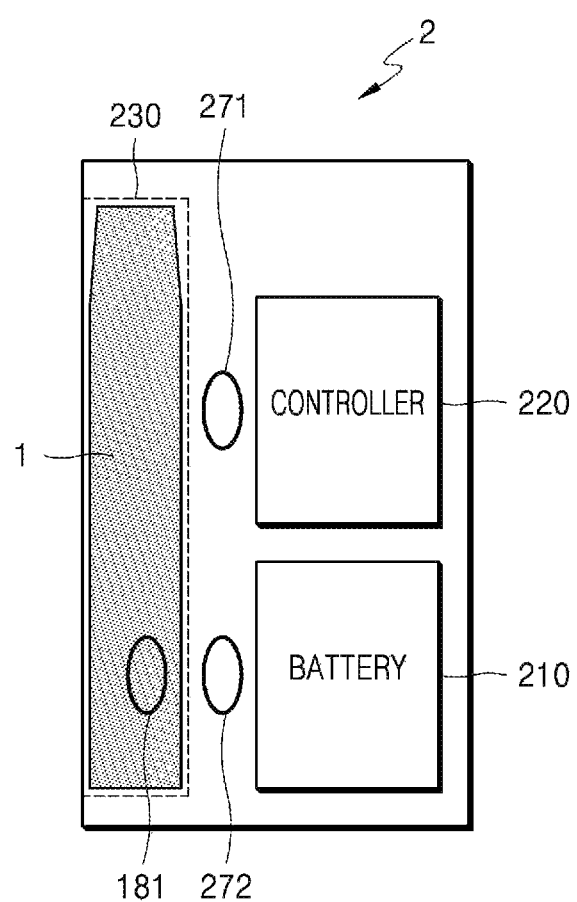
FIG. 11 is a diagram showing an example in which a holder is inserted into a cradle.

FIG. 11 is a diagram showing an example in which a holder is inserted into a cradle.

Referring to FIG. 11, an example in which the holder 1 is inserted into the cradle 2 is shown. Since the space 230 into which the holder 1 is to be inserted is present on one side surface of the cradle 2, the inserted holder 1 may not be exposed to the outside by the other side surfaces of the cradle 2. Therefore, the cradle 2 may not include another component (e.g., a lid) for not exposing the holder 1 to the outside.

The cradle 2 may include at least one attaching member 271 and/or 272 to increase attachment strength with the holder 1. Also, at least one attaching member 181 may be included in the holder 1 as well. Here, attaching members 181, 271, and 272 may be magnets, but are not limited thereto. Although FIG. 11 shows that the holder 1 includes one attaching member 181 and the cradle 2 includes two attaching members 271 and 272 for convenience of explanation, the number of the attaching members 181, 271, and 272 is not limited thereto.

The holder 1 may include the attaching member 181 at a first position and the cradle 2 may include the attaching members 271 and 272 at a second position and a third position, respectively. In this case, the first position and the third position may be positions facing each other when the holder 1 is inserted into the cradle 2.

Since the attaching members 181, 271, and 272 are included in the holder 1 and the cradle 2, the holder 1 and the cradle 2 may be attached to each other more strongly even when the holder 1 is inserted into one side surface of the cradle 2. In other words, as the holder 1 and the cradle 2 further include the attaching members 181, 271, and 272 in addition to the terminals 170 and 260, the holder 1 and the cradle 2 may be attached to each other more strongly. Therefore, even when there is no separate component (e.g., a lid) in the cradle 2, the inserted holder 1 may not be easily separated from the cradle 2.

Also, when the controller 220 also determines that the holder 1 is completely inserted into the cradle 2 through the terminals 170 and 260 and/or the attaching members 181, 271, and 272, the controller 220 may charge the battery 110 of the holder 1 by using power of the battery 210.

Figure 12:
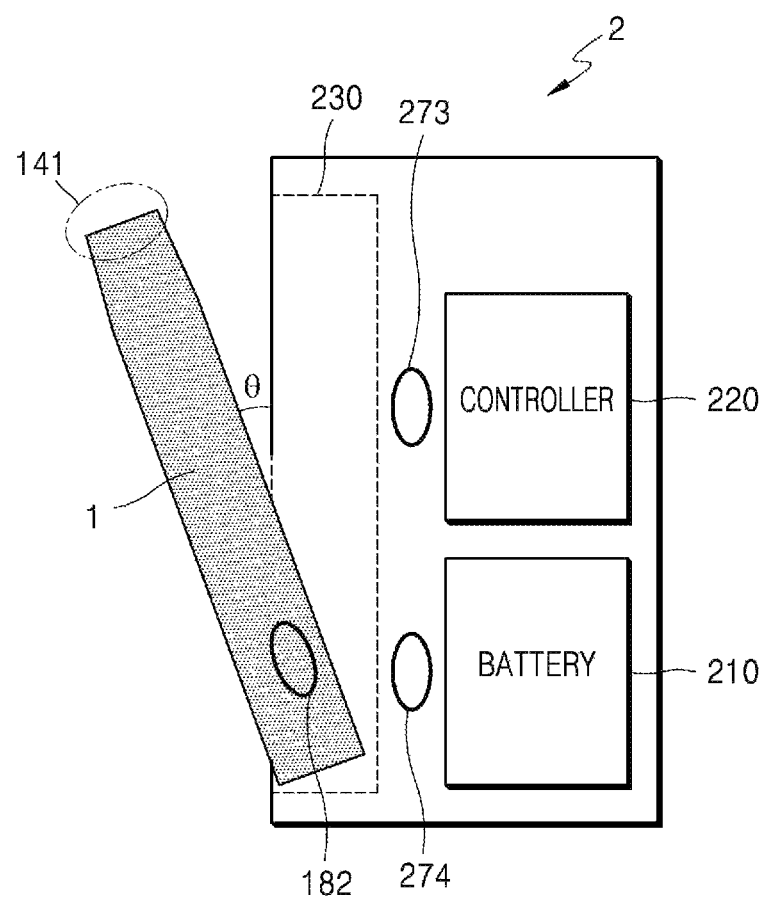
FIG. 12 is a diagram showing an example in which a holder is tilted while inserted into a cradle.

FIG. 12 is a diagram showing an example in which a holder is tilted while inserted into a cradle.

Referring to FIG. 12, the holder 1 is tilted in the cradle 2. Here, the term 'tilting' indicates that the holder 1 is inclined at a certain angle in a state while the holder 1 is being inserted into the cradle 2.

As shown in FIG. 11, when the holder 1 is completely inserted into the cradle 2, a user may not smoke. In other words, once the holder 1 is completely inserted into the cradle 2, a cigarette may not be inserted into the holder 1. Therefore, when the holder 1 is completely inserted into the cradle 2, a user may not smoke.

As shown in FIG. 12, when the holder 1 is tilted, the terminal end 141 of the holder 1 is exposed to the outside. Therefore, the user may insert a cigarette into the terminal end 141 and smoke generated aerosol. A sufficient tilting angle $\theta$ may be secured to prevent a cigarette from being bent or damaged when the cigarette is inserted into the terminal end 141 of the holder 1. For example, the holder 1 may be tilted at an angle at which an entire cigarette insertion hole in the terminal end 141 may be exposed to outside. For example, the range of the tilting angle $\theta$ may be greater than 0° and not greater than 180° and may preferably be not less than 10° and not greater than 90°. More preferably, the range of the tilting angle $\theta$ may be from 10° to 20°, from 10° to 30°, from 10° to 40°, from 10° to 50°, or from 10° to 60°.

Also, even when the holder 1 is tilted, the terminal 170 of the holder 1 and the terminal 260 of the cradle 2 are coupled with each other. Therefore, the heater 130 of the holder 1 may be heated by power supplied by the battery 210 of the cradle 2. Therefore, the holder 1 may generate aerosol by using the battery 210 of the cradle 2 even when the remaining power of the battery 110 of the holder 1 is low or the battery 110 of the holder 1 is completely discharged.

FIG. 12 shows an example in which the holder 1 includes one attaching member 182 and the cradle 2 includes two attaching members 273 and 274. For example, the respective positions of the attaching members 182, 273, and 274 are as described above with reference to FIG. 11. Assuming that the attaching members 182, 273, and 274 are magnets, the magnetic strength of the attaching member 274 may be greater than the magnetic strength of the attaching member 273. Therefore, the holder 1 may not be completely separated from the cradle 2 due to the attaching member 182 and the attaching member 274 even when the holder 1 is tilted.

Also, when it is determined that the holder 1 is titled through the terminals 170 and 260 and/or the attaching members 181, 271, and 272, the controller 220 may heat the heater 130 of the holder 1 or charge the battery 110 by using power of the battery 210.

Figure 13A:
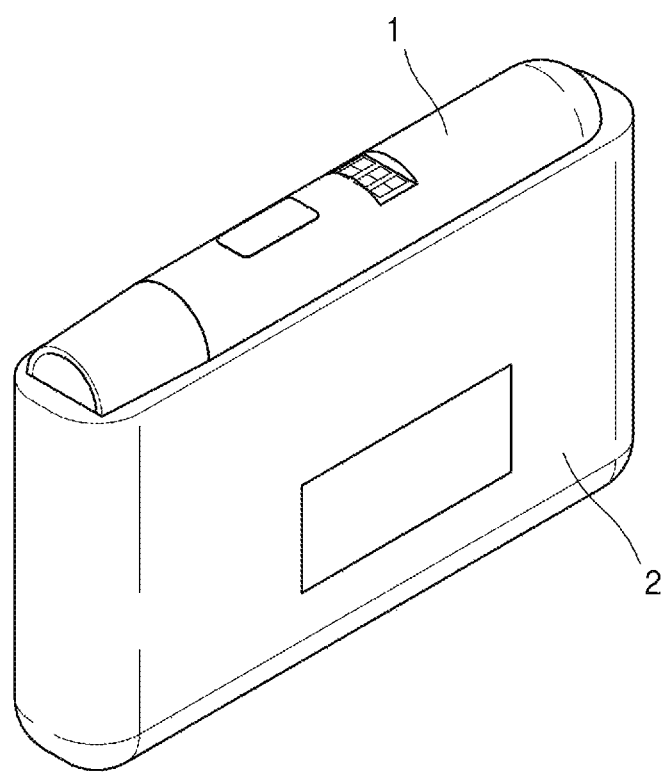
FIGS. 13A to 13B are diagrams showing examples in which a holder is inserted into a cradle.
Figure 13B:
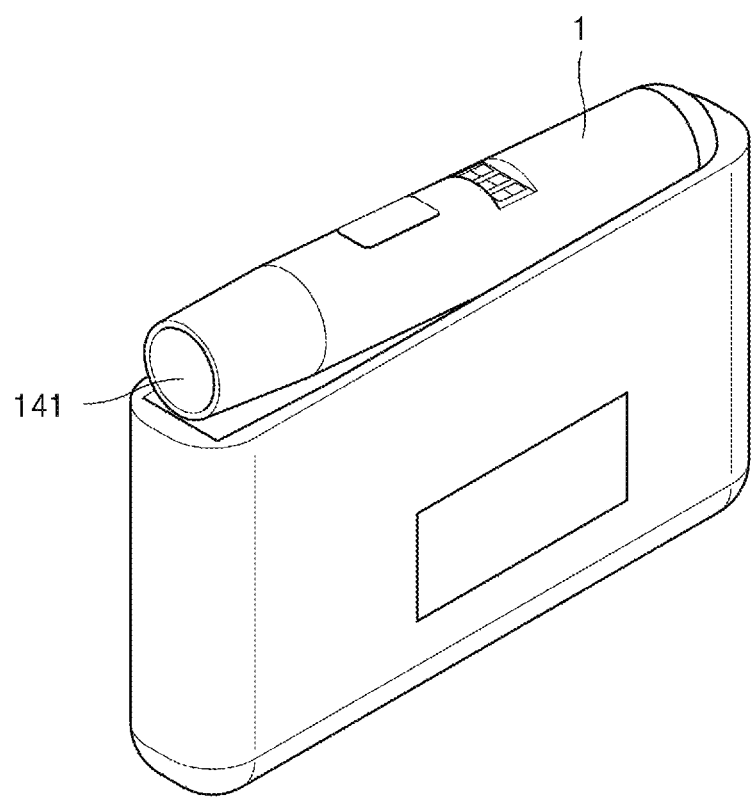

FIGS. 13A and 13B are diagrams showing examples in which a holder is inserted into a cradle.

FIG. 13A shows an example in which the holder 1 is completely inserted into the cradle 2. The cradle 2 may be fabricated to provide the sufficient inner space 230 of the cradle 2 to minimize the contact of a user with the holder 1 when the holder 1 is completely inserted into the cradle 2. When the holder 1 is completely inserted into the cradle 2, the controller 220 supplies power of the battery 210 to the holder 1, such that the battery 110 of the holder 1 is charged.

FIG. 13B shows an example in which the holder 1 is tilted while being inserted into the cradle 2. When the holder 1 is tilted, the controller 220 supplies power of the battery 210 to the holder 1, such that the battery 110 of the holder 1 is charged or the heater 130 of the holder 1 is heated.

Figure 14:
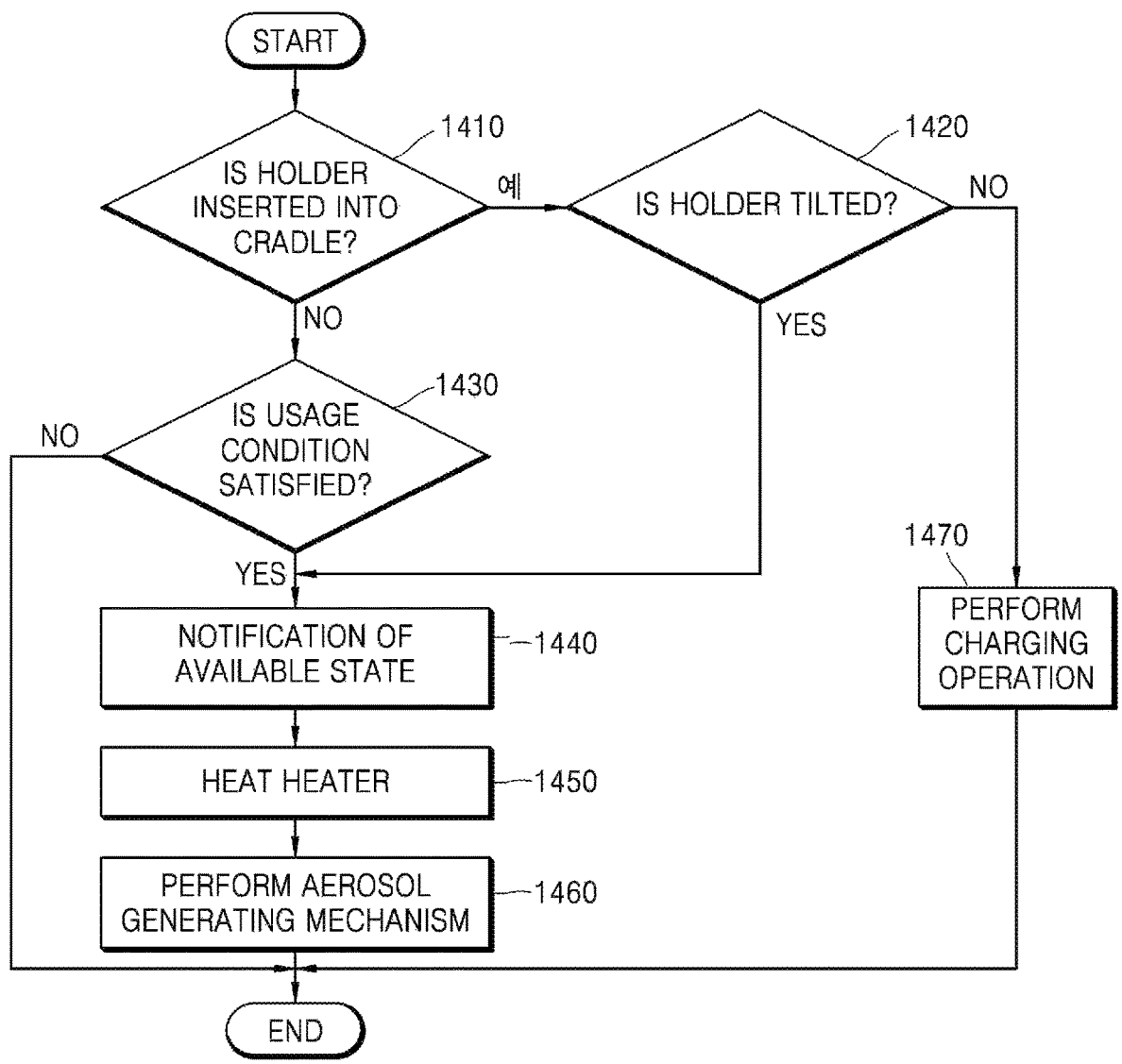
FIG. 14 is a flowchart for describing an example of operation of a holder and a cradle.

FIG. 14 is a flowchart for describing an example in which a holder and a cradle operates.

A method for generating aerosols shown in FIG. 14 includes operations that are performed in a time-series manner by the holder 1 shown in FIG. 7 or the cradle 2 shown in FIG. 9. Therefore, it will be understood that the descriptions given above with respect to the holder 1 shown in FIG. 7 and the cradle 2 shown in FIG. 9 also apply to the method of FIG. 14, even when the descriptions are omitted below.

In operation 1410, the holder 1 determines whether it is inserted in the cradle 2. For example, the controller 120 may determine whether the holder 1 is inserted into the cradle 2 based on whether the terminals 170 and 260 of the holder 1 and the cradle 2 are connected to each other and/or whether the attaching members 181, 271, and 272 are operating.

When the holder 1 is inserted into the cradle 2, the method proceeds to operation 1420. When the holder 1 is separated from the cradle 2, the method proceeds to operation 1430.

In operation 1420, the cradle 2 determines whether the holder 1 is tilted. For example, the controller 220 may determine whether the holder 1 is inserted into the cradle 2 based on whether the terminals 170 and 260 of the holder 1 and the cradle 2 are connected to each other and/or whether attaching members 182, 273, and 274 are operating.

Although it is described that the cradle 2 determines whether the holder 1 is tilted in operation 1420, the present disclosure is not limited thereto. In other words, the controller 120 of the holder 1 may determine whether the holder 1 is tilted.

When the holder 1 is tilted, the method proceeds to operation 1440. When the holder 1 is not tilted (i.e., the holder 1 is completely inserted into the cradle 2), the method proceeds to operation 1470.

In operation 1430, the holder 1 determines whether conditions of using the holder 1 are satisfied. For example, the controller 120 may determine whether the conditions for using the holder 1 are satisfied by checking whether the remaining power of the battery 110 and whether other components of the holder 1 may be normally operated.

When the conditions for using the holder 1 are satisfied, the method proceeds to operation 1440. Otherwise, the method is terminated.

In operation 1440, the holder 1 informs a user that the holder 1 is ready to be used. For example, the controller 120 may output an image indicating that the holder 1 is ready to be used on the display of the holder 1 or may control the motor of the holder 1 to generate a vibration signal.

In operation 1450, the heater 130 is heated. For example, when the holder 1 is separated from the cradle 2, the heater 130 may be heated by power of the battery 110 of the holder 1. In another example, when the holder 1 is tilted, the heater 130 may be heated by power of the battery 210 of the cradle 2.

The controller 120 of the holder 1 or the controller 220 of the cradle 2 may check the temperature of the heater 130 in real time and control an amount of power supplied to the heater 130 and a time for supplying the power to the heater 130. For example, the controller 120 or 220 may check the temperature of the heater 130 in real time through a temperature sensor included in the holder 1 or an electrically conductive track of the heater 130.

In operation 1460, the holder 1 performs an aerosol generation mechanism. For example, the controller 120, 220 may check the temperature of the heater 130, which changes as a user performs puffs, and adjust an amount of power supplied to the heater 130 or stop supplying power to the heater 130. Also, the controller 120 or 220 may count the number of puffs of the user and output information indicating that the holder 1 needs to be cleaned when the number of puffs reaches a certain number of times (e.g., 1500).

In operation 1470, the cradle 2 performs charging of the holder 1. For example, the controller 220 may charge the holder 1 by supplying power of the battery 210 of the cradle 2 to the battery 110 of the holder 1.

Meanwhile, the controller 120 or 220 may stop the operation of the holder 1 according to the number of puffs of the user or the operation time of the holder 1. Hereinafter, an example in which the controller 120 or 220 stops the operation of the holder 1 will be described with reference to FIG. 15.

Figure 15:
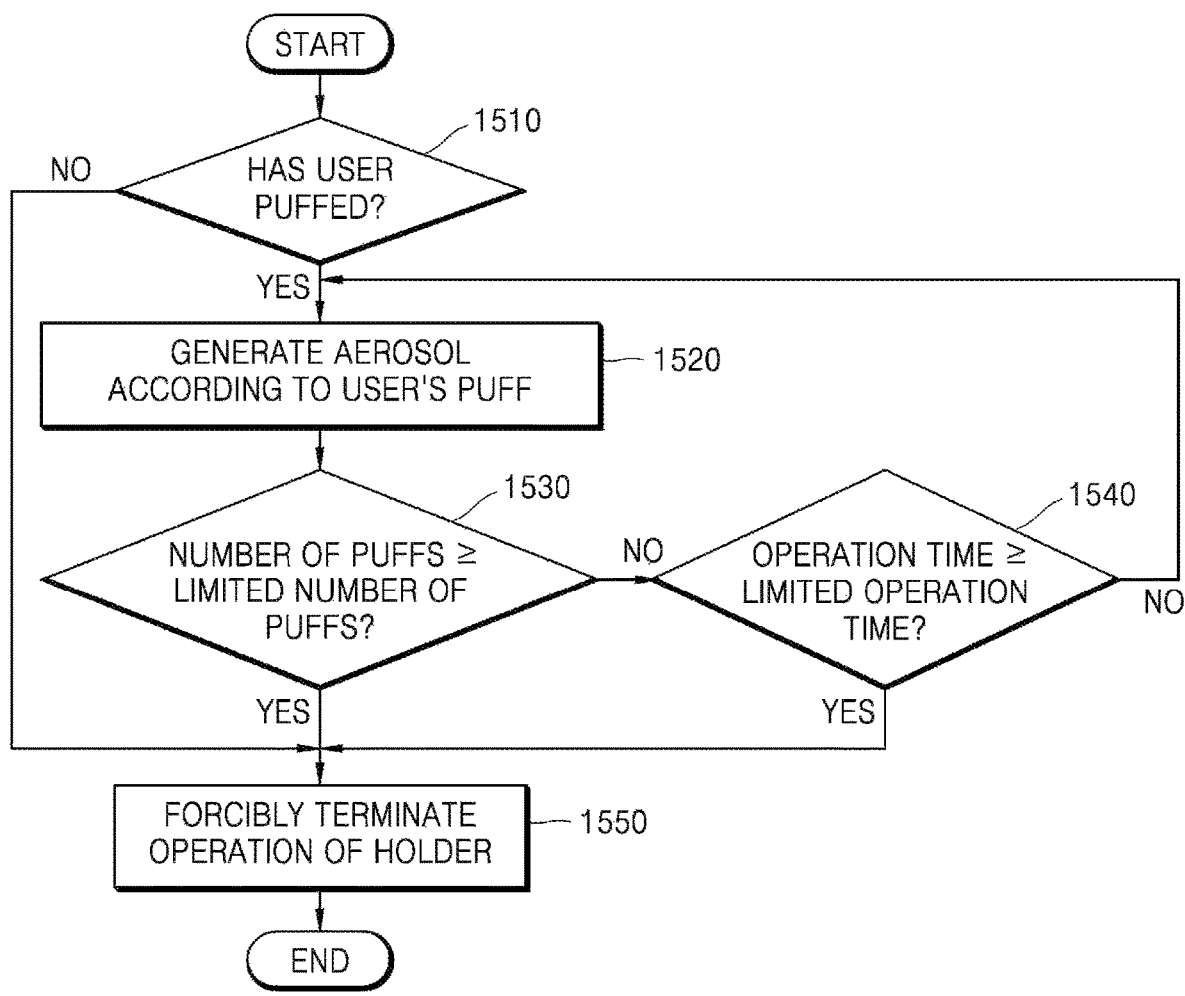
FIG. 15 is a flowchart for describing another of operation of a holder.

FIG. 15 is a flowchart for describing another example of operations of a holder.

A method for generating aerosols shown in FIG. 15 includes operations that are performed in a time-series manner by the holder 1 shown in FIG. 7 and the cradle 2 shown in FIG. 9. Therefore, it will be understood that the descriptions given above with respect to the holder 1 shown in FIG. 7 or the cradle 2 shown in FIG. 9 also apply to the method of FIG. 15, even when the descriptions are omitted below.

In operation 1510, the controller 120 or 220 determines whether a user puffed. For example, the controller 120 or 220 may determine whether the user puffed through the puff detecting sensor included in the holder 1.

In operation 1520, aerosol is generated according to the puff of the user. The controller 120 or 220 may adjust power supplied to the heater 130 according to the puff of the user the temperature of the heater 130, as described above with reference to FIG. 14. Also, the controller 120 or 220 counts the number of puffs of the user.

In operation 1530, the controller 120 or 220 determines whether the number of puffs of the user equal to or greater than a puff limit number. For example, assuming that the puff limit number is set to 14, the controller 120 or 220 determines whether the number of counted puffs is 14 or more.

On the other hand, when the number of puffs of the user is close to the puff limit number (e.g., when the number of puffs of the user is 12), the controller 120 or 220 may output a warning signal through a display or a vibration motor.

When the number of puffs of the user is equal to or greater than the puff limit number, the method proceeds to operation 1550. When the number of puffs of the user is less than the puff limit number, the method proceeds to operation 1540.

In operation 1540, the controller 120 or 220 determines whether the operation time of the holder 1 is equal to or greater than an operation limit time. Here, the operation time of the holder 1 refers to accumulated time from a time point at which the holder 1 started its operation to a current time point. For example, assuming that the operation limit time is set to 10 minutes, the controller 120 or 220 determines whether the holder 1 is operating for 10 minutes or longer.

On the other hand, when the operation time of the holder 1 is close to the operation limit time (e.g., when the holder 1 is operating for 8 minutes), the controller 120 or 220 may output a warning signal through a display or a vibration motor.

When the holder 1 is operating for the operation limit time or longer, the method proceeds to operation 1550. When the operation time of the holder 1 is less than the operation limit time, the method proceeds to operation 1520.

In operation 1550, the controller 120 or 220 forcibly terminates the operation of the holder 1. In other words, the controller 120 or 220 terminates the aerosol generation mechanism of the holder 1. For example, the controller 120 or 220 may forcibly terminate the operation of the holder 1 by interrupting the power supplied to the heater 130.

Figure 16:
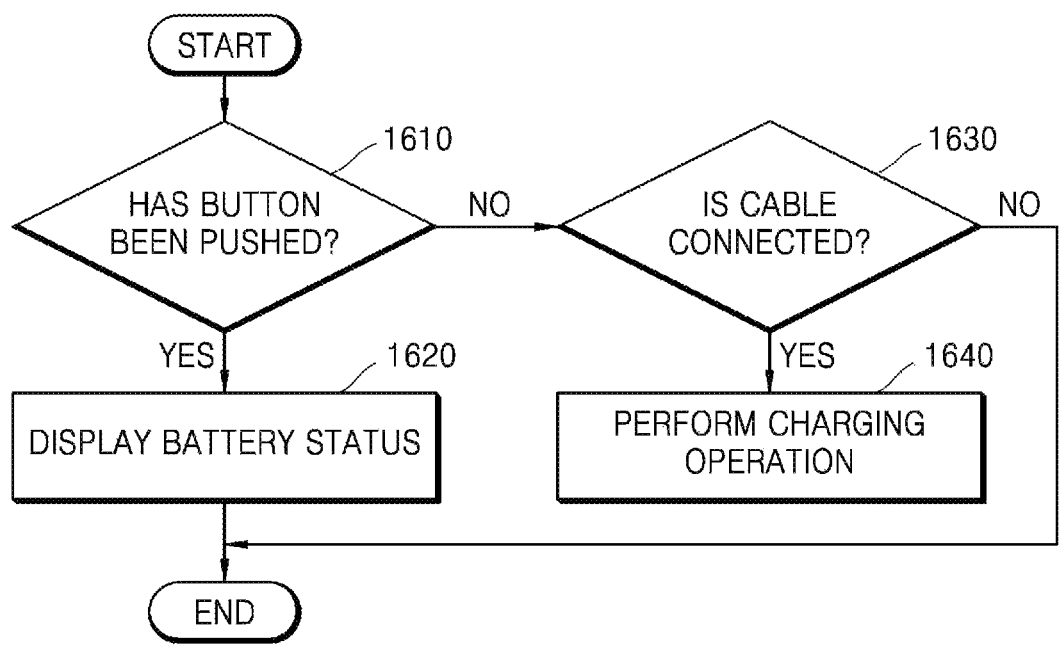
FIG. 16 is a flowchart for describing an example of operation of a cradle.

FIG. 16 is a flowchart for describing an example of operations of a cradle.

The flowchart shown in FIG. 16 includes operations that are performed in a time-series manner by the cradle 2 shown in FIG. 9. Therefore, it will be understood that the descriptions given above with respect to the cradle 2 shown in FIG. 9 also apply to the method of FIG. 16, even when the descriptions are omitted below.

Although not shown in FIG. 16, the operation of the cradle 2 to be described below may be performed regardless of whether the holder 1 is inserted into the cradle 2.

In operation 1610, the controller 220 of the cradle 2 determines whether the button 240 is pressed. When the button 240 is pressed, the method proceeds to operation 1620. When the button 240 is not pressed, the method proceeds to operation 1630.

In operation 1620, the cradle 2 indicates the status of the battery 210. For example, the controller 220 may output information regarding the current state of the battery 210 (e.g., remaining power, etc.) on the display 250.

In operation 1630, the controller 220 of the cradle 2 determines whether a cable is connected to the cradle 2. For example, the controller 220 determines whether a cable is connected to an interface (e.g., a USB port, etc.) included in the cradle 2. When a cable is connected to the cradle 2, the method proceeds to operation 1640. Otherwise, the method is terminated.

In operation 1640, the cradle 2 performs a charging operation. For example, the cradle 2 charges the battery 210 by using power supplied through a connected cable.

As described above with reference to FIG. 7, a cigarette may be inserted into the holder 1. The cigarette includes an aerosol generating material and aerosol is generated by the heated heater 130.

Hereinafter, examples of a cigarette that may be inserted into the holder 1 will be described with reference to FIGS. 17 to 19F.

Figure 17:
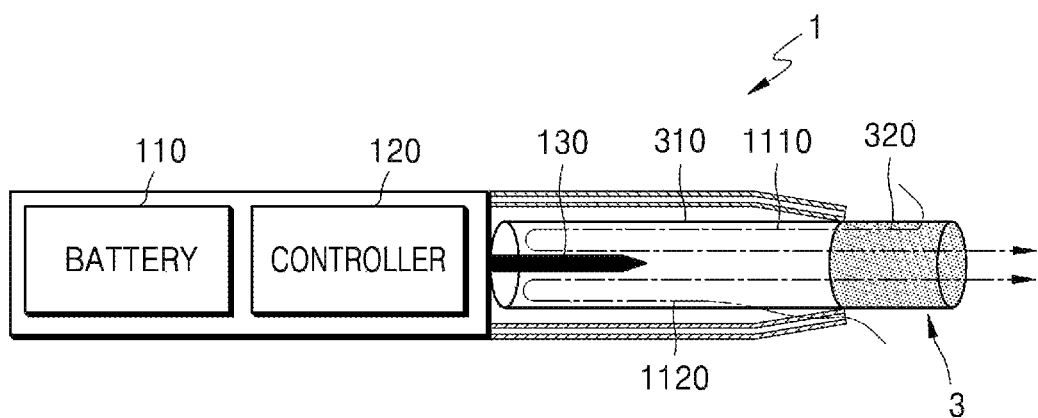
FIG. 17 is a diagram showing an example in which a cigarette is inserted into a holder.

FIG. 17 is a diagram showing an example in which a cigarette is inserted into a holder.

Referring to FIG. 17, the cigarette 3 may be inserted into the holder 1 through the terminal end 141 of the casing 140. When the cigarette 3 is inserted into the holder 1, the heater 130 is located inside the cigarette 3. Therefore, the heated heater 130 heats the aerosol generating material of the cigarette 3, thereby generating aerosol.

The cigarette 3 may be similar to a typical burning cigarette. For example, the cigarette 3 may include a first portion 310 containing an aerosol generating material and a second portion 320 including a filter and the like. Meanwhile, the cigarette 3 according to one embodiment may also include an aerosol generating material in the second portion 320. For example, an aerosol generating material in the form of granules or capsules may be inserted into the second portion 320.

The entire first portion 310 may be inserted into the holder 1 and the second portion 320 may be exposed to the outside. Alternatively, only a portion of the first portion 310 may be inserted into the holder 1 or the entire first portion 310 and a portion of the second portion 320 may be inserted into the holder 1.

A user may inhale the aerosol while holding the second portion 320 by his/her lips. Here, the aerosol is mixed with external air and delivered to the mouth of the user. As shown in FIG. 17, the external air may be introduced through at least one hole in a surface of the cigarette 3 (1110), or through at least one air passage formed in the holder 1 (1120). For example, the air passage formed in the holder 1 may be configured to be open/closed by the user.

Figure 18A:
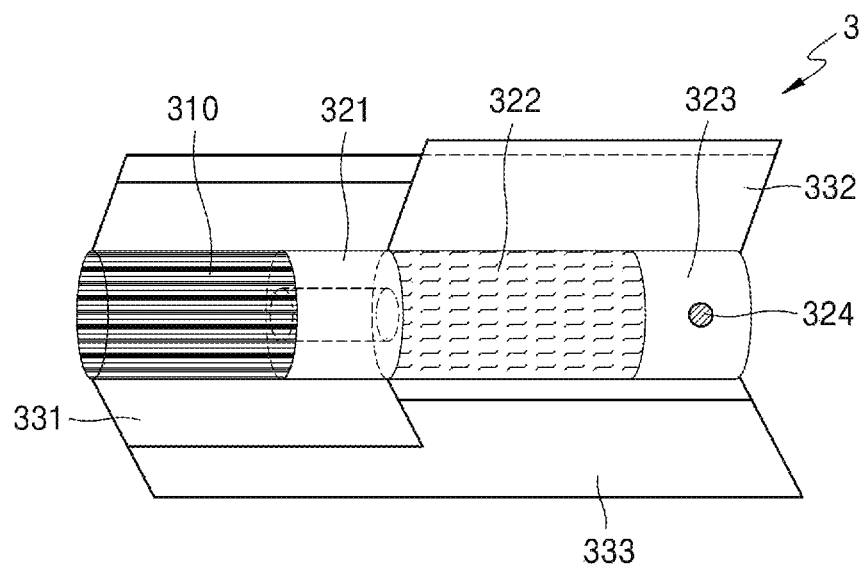
FIGS. 18A and 18B are block diagrams showing examples of a cigarette.
Figure 18B:
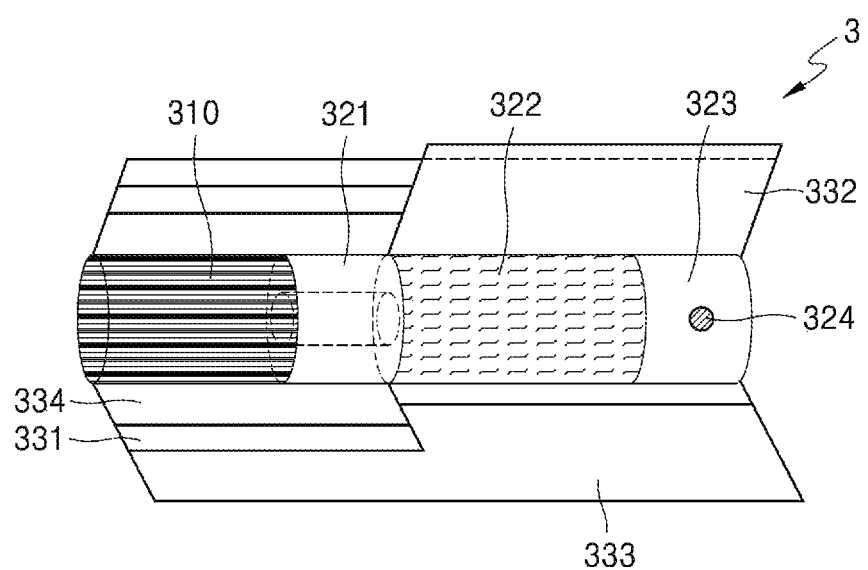

FIGS. 18A and 18B are block diagrams showing examples of a cigarette.

Referring to FIGS. 18A and 18B, the cigarette 3 includes a tobacco portion 310, a first filter segment 321, a cooling structure 322, and a second filter segment 323. The first portion 310 described above with reference to FIG. 17 includes the tobacco portion 310 and a second portion 320 includes the first filter segment 321, the cooling structure 322, and the second filter segment 323.

When FIG. 18A is compared with FIG. 18B, the cigarette 3 shown in FIG. 18B may further include a fourth wrapper 334 as compared with the cigarette 3 of FIG. 18A.

The structures of the cigarette 3 shown in FIGS. 18A and 18B are merely examples, and some of the components may be omitted. For example, the cigarette 3 may not include one or more of the first filter segment 321, the cooling structure 322, and the second filter segment 323.

The tobacco portion 310 includes an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol. The tobacco portion 310 may have a length of about 7 mm to 15 mm, preferably, about 12 mm. Also, the tobacco portion 310 may have a diameter of 7 mm to 9 mm, preferably, about 7.9 mm. The length and diameter of the tobacco portion 310 are not limited to the above numerical ranges.

In addition, the tobacco portion 310 may include other additive materials like a flavoring agent, a wetting agent, and/or an acetate compound. For example, the flavoring agent may include licorice, sucrose, fructose syrup, iso-sweet, cocoa, lavender, cinnamon, cardamom, celery, fenugreek, cascara, sandalwood, bergamot, geranium, honey essence, rose oil, vanilla, lemon oil, orange oil, mint oil, cinnamon, keragene, cognac, jasmine, chamomile, menthol, cinnamon, ylang ylang, salvia, spearmint, ginger, coriander, coffee, etc. In addition, the wetting agent may include glycerine or propylene glycol.

For example, the tobacco portion 310 may be filled with cut tobacco leaves. Here, cut tobacco leaves may be formed by fine-grinding a tobacco sheet.

For a large wide tobacco sheet to be filled within the tobacco portion 310 having a narrow space, an operation for facilitating folding of the tobacco sheet is further needed. Therefore, it is easier to fill the tobacco portion 310 with cut tobacco leaves compared to filling the tobacco portion 310 with a tobacco sheet, and thus the productivity and the efficiency of the process for producing the tobacco portion 310 may be improved.

In another example, the tobacco portion 310 may be filled with a plurality of cigarette strands formed by fine-cutting a tobacco sheet. For example, the tobacco portion 310 may be formed by combining a plurality of tobacco strands in the same direction (parallel to one another) or randomly. Each of the tobacco strands may be fabricated to have a cuboidal shape having the horizontal length of 1 mm, the vertical length of 12 mm, and the thickness (height) of 0.1 mm, but is not limited thereto.

Compared to the tobacco portion 310 filled with a cigarette sheet, the tobacco portion 310 filled with tobacco strands may generate a greater amount of aerosol. In the case of filling the same space, compared to a tobacco sheet, tobacco strands ensure a wider surface area. A wider surface area indicates that an aerosol generating material has a greater chance of contacting the outside air. Therefore, when the tobacco portion 310 is filled with tobacco strands, more aerosol may be generated as compared to the tobacco portion 310 filled with a tobacco sheet.

Furthermore, when the cigarette 3 is separated from the holder 1, the tobacco portion 310 filled with tobacco strands may be separated more easily than the tobacco portion 310 filled with a tobacco sheet. Compared with the tobacco sheet, less frictional force is generated when the tobacco strands are in contact with the heater 130. In other words, when the tobacco portion 310 is filled with tobacco strands, the tobacco portion 310 may be more easily separated from the holder 1 than the tobacco portion 310 filled with a tobacco sheet.

The tobacco sheet may be obtained by grinding a raw tobacco material as a slurry and drying the slurry. For example, the slurry may include the aerosol generating material by 15% to 30%. The raw tobacco material may be tobacco leaf fragments, tobacco stems, fine tobacco powders formed during treatment of tobacco, and/or main leaf blade strips of the tobacco leaves. The tobacco sheet may also include other additives like wood cellulose fibers.

The first filter segment 321 may be a cellulose acetate filter. For example, the first filter segment 321 may have a tubular structure including a hollow therein. The first filter segment 321 may have a length of about 7 mm to about 15 mm, for example, preferably 7 mm. The first filter segment 321 may have a length less than about 7 mm, but may have a length that may interfere with performances of at least one cigarette element (e.g., cooling element, capsule, acetate filter, etc.). The length of the first filter segment 321 is not limited to the above stated numerical range. In addition, the length of the first filter segment 321 may expand, and a total length of the cigarette 3 may be adjusted according to the length of the first filter segment 321.

The second filter segment 323 may also be a cellulose acetate filter. For example, the second filter segment 323 may be fabricated as a recess filter having a hollow therein, but is not limited thereto. The second filter segment 323 may have a length of about 5 mm to about 15 mm, preferably, about 12 mm. The length of the second filter segment 323 is not limited to the above stated numerical range.

Also, the second filter segment 323 may include at least one capsule 324. Here, the capsule 324 may have a structure in which a liquid containing a flavoring material is wrapped with a film. For example, the capsule 324 may have a spherical or cylindrical shape. The capsule 324 may have a diameter equal to or greater than 2 mm, preferably, 2 to 4 mm.

A film of the capsule 324 may include starch and/or a gelling agent. For example, gellan gum or gelatin may be used as the gelling agent. Also, a gelation aid may be further used to form the film of the capsule 324. Here, as the gelation aid, for example, calcium chloride may be used. Furthermore, a plasticizer may be further used as a material for forming the film of the capsule 324. As the plasticizer, glycerine and/or sorbitol may be used. Furthermore, a coloring agent may be further used as a material for forming the film of the capsule 324.

For example, as a flavoring material included in the liquid of the capsule 324, menthol, plant essential oil, and the like may be used. As a solvent of the flavoring material included in the liquid, for example, a medium chain fatty acid triglyceride (MCT) may be used. Also, the liquid may include other additives like a figment, an emulsifying agent, a thickening agent, etc.

The cooling structure 322 cools aerosol generated as the heater 130 heats the tobacco portion 310. Therefore, a user may inhale aerosol cooled to a suitable temperature. The cooling structure 322 may have a length of about 10 mm to about 20 mm, preferably, about 14 mm. The length of the cooling structure 322 is not limited to the above stated numerical range.

For example, the cooling structure 322 may include polylactic acid. The cooling structure 322 may be manufactured in various shapes in order to increase a surface area per unit area (that is, a surface area contacting the aerosol). Various examples of the cooling structure 322 will be described later with reference to FIGS. 19A to 19F.

The tobacco portion 310 and the first filter segment 321 may be wrapped by the first wrapper 331. For example, the first wrapper 331 may include a paper-based packaging material having an oil resistance.

The cooling structure 322 and the second filter segment 323 may be packaged by a second wrapper 332. Also, the cigarette 3 as a whole may be re-packaged by a third wrapper 333. For example, the second wrapper 332 and the third wrapper 333 may include a general paper-based packaging material. Optionally, the second wrapper 332 may be oil resistant hard wrap or PLA flavored paper. Also, the second wrapper 332 packages a portion of the second filter segment 323, and may additionally package the second filter segment 323 and the cooling structure 322.

Referring to FIG. 18B, the cigarette 3 may include a fourth wrapper 334. At least one of the tobacco portion 310 and the first filter segment 321 may be wrapped by the fourth wrapper 334. In other words, only the tobacco portion 310 may be wrapped by the fourth wrapper 334, and the tobacco portion 310 and the first filter segment 321 may be wrapped by the fourth wrapper 334. For example, the fourth wrapper 334 may include a paper-based packaging material.

The fourth wrapper 334 may be manufactured by applying (or coating) a predetermined material onto a surface or opposite surfaces of the paper-based packaging material. Here, an example of the predetermined material may be, but is not limited to, silicon. Silicon exhibits characteristics like heat resistance with little change due to the temperature, oxidation resistance, resistance to various chemicals, water repellency, electrical insulation, etc. However, other materials than the silicon may be applied (or coated) onto the fourth wrapper 334, provided that the materials have the above mentioned characteristics.

In addition, FIG. 18B shows that the cigarette 3 includes both the first wrapper 331 and the fourth wrapper 334, but one or more embodiments are not limited thereto. That is, the cigarette 3 may include only one of the first wrapper 331 and the fourth wrapper 334.

The fourth wrapper 334 may prevent the cigarette 3 from burning. For example, when the tobacco portion 310 is heated by the heater 130, there is a possibility that the cigarette 3 is burned. In detail, when the temperature is raised to a temperature above the ignition point of any one of materials included in the tobacco portion 310, the cigarette 3 may be burned. In this case, since the fourth wrapper 334 includes a non-combustible material, burning of the cigarette 3 may be prevented.

Also, the fourth wrapper 334 may prevent the holder 1 from being contaminated by materials generated from the cigarette 3. Through puffs of a user, liquid substances may be formed in the cigarette 3. For example, as the aerosol formed by the cigarette 3 is cooled by the outside air, liquid materials (e.g., moisture, etc.) may be formed. Since the fourth wrapper 334 wraps the tobacco portion 310 and/or the first filter segment 321, liquid materials generated in the cigarette 3 may be prevented from leaking to an outer portion of the cigarette 3. Accordingly, the casing 140 of the holder 1 and the like may be prevented from being contaminated by the liquid materials formed by the cigarette 3.

FIGS. 19A to 19F are diagrams showing examples of a cooling structure of a cigarette.

For example, the cooling structure shown in FIGS. 19A to 19F may be manufactured by using fibers produced from pure polylactic acid.

As an example, when the cooling structure is manufactured by filling films (sheets), the film (sheet) may break due to external shock. In this case, the aerosol cooling effect of the cooling structure is decreased.

In another example, when a cooling structure is manufactured through extrusion molding or the like, the efficiency of the process is lowered due to the addition of operations like cutting of a structure. Also, there are limits in manufacturing a cooling structure in various shapes.

As the cooling structure according to an embodiment is fabricated by using polylactic acid fibers (e.g., weaving), the risk of the cooling structure being deformed or losing function by an external impact may be reduced. Also, by changing the way of combining the fibers, the cooling structure having various shapes may be fabricated.

Also, since the cooling structure is fabricated by using the fibers, a surface area contacting the aerosol may be increased. Therefore, the aerosol cooling effect of the cooling structure may be further improved.

Figure 19A:
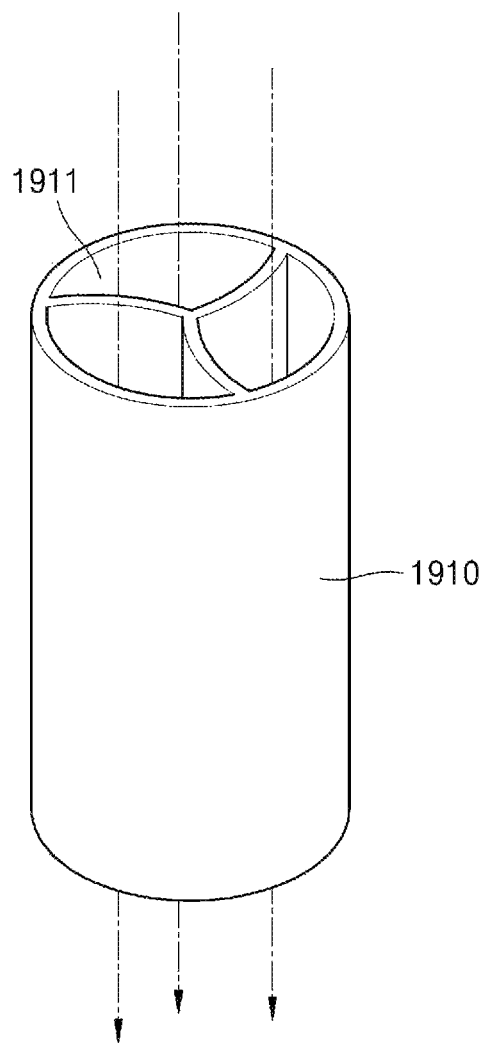
FIGS. 19A to 19F are diagrams showing examples of a cooling structure of a cigarette.

Referring to FIG. 19A, a cooling structure 1910 may have a cylindrical shape, and a cross-section of the cooling structure 1910 may include at least one air passage 1911.

Figure 19B:
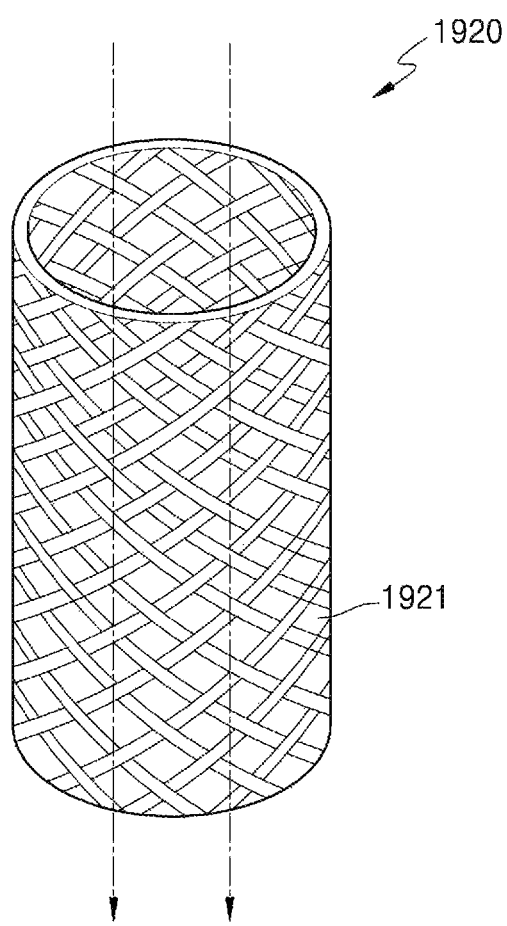

Referring to FIG. 19B, a cooling structure 1920 may be fabricated as a structure, in which a plurality of fibers are tangled with one another. Here, the aerosol may flow among the fibers, vortex may be formed depending on a shape of the cooling structure 1920. The vortex expands an area of contact of the aerosol in the cooling structure 1920 and increases the time that the aerosol stays in the cooling structure 1920. Therefore, heated aerosol may be effectively cooled.

Figure 19C:
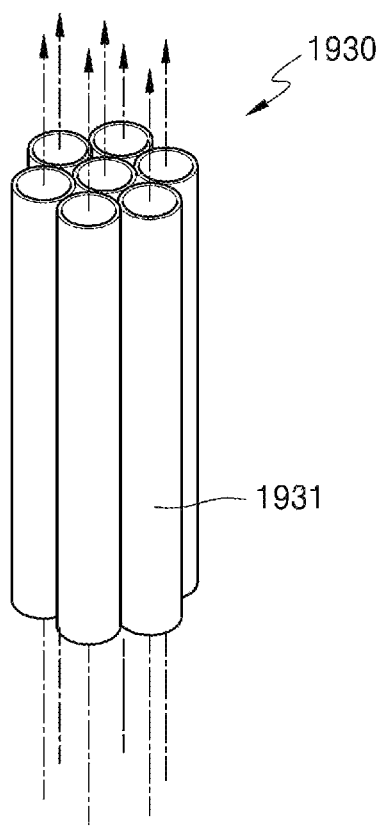

Referring to FIG. 19C, a cooling structure 1930 may be fabricated as a structure, in which a plurality of bundles 1931 are gathered.

Figure 19D:
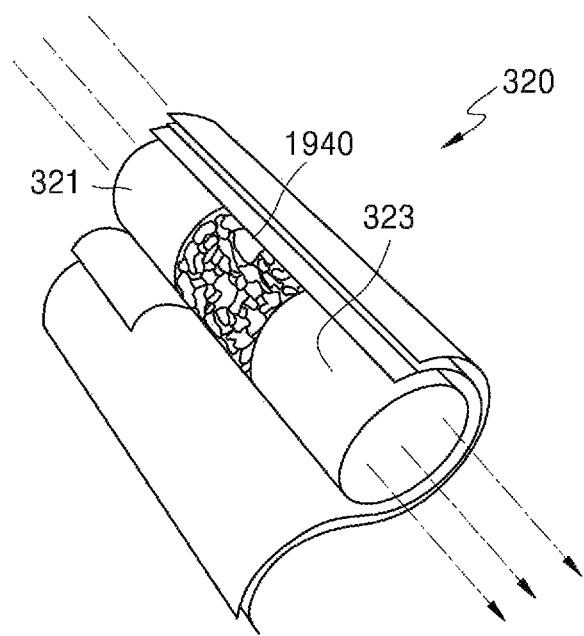

Referring to FIG. 19D, a cooling structure 1940 may be filled with granules formed of polylactic acid, cut leaves, or charcoal. Also, the granules may be fabricated by using a mixture of polylactic acid, cut leaves, and charcoal. On the other hand, the granules may further include an element capable of increasing the aerosol cooling effect other than polylactic acid, the cut leaves, and/or charcoal.

Figure 19E:
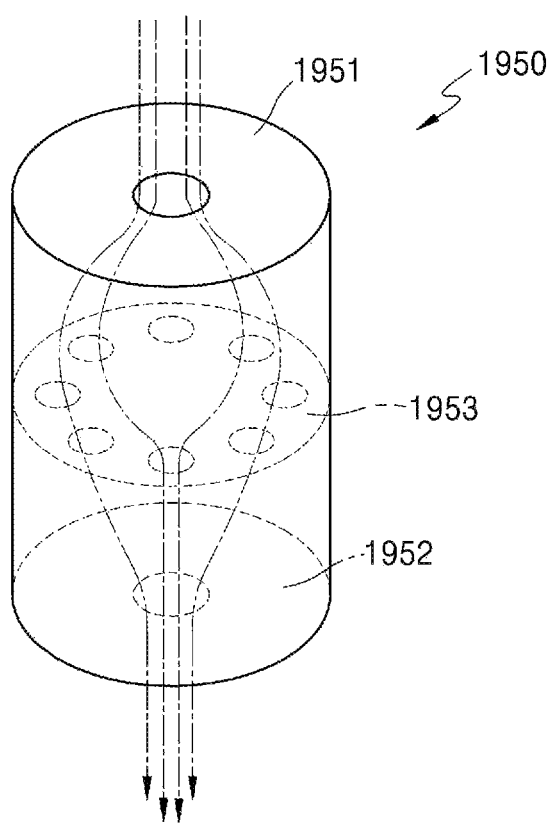

Referring to FIG. 19E, a cooling structure 1950 may have a first cross-section 1951 and a second cross-section 1952.

The first cross-section 1951 may bound on the first filter segment 321 and may include an opening, through which the aerosol is introduced. The second cross-section 1952 may bound on the second filter segment 323 and may include an opening, through which the aerosol may be discharged. For example, each of the first cross-section 1951 and the second cross-section 1952 may include a single opening having the same diameter, but the diameters and the numbers of the openings included in the first cross-section 1951 and the second cross-section 1952 are not limited thereto.

In addition, the cooling structure 1950 may include a third cross-section 1953 having a plurality of openings, between the first cross-section 1951 and the second cross-section 1952. For example, the diameters of the plurality of openings included in the third cross-section 1953 may be smaller than the diameters of the gaps included in the first cross-section 1951 and the second cross-section 1952. Also, the number of openings included in the third cross-section 1953 may be greater than the number of openings included in the first cross-section 1951 and the second cross-section 1952.

Figure 19F:
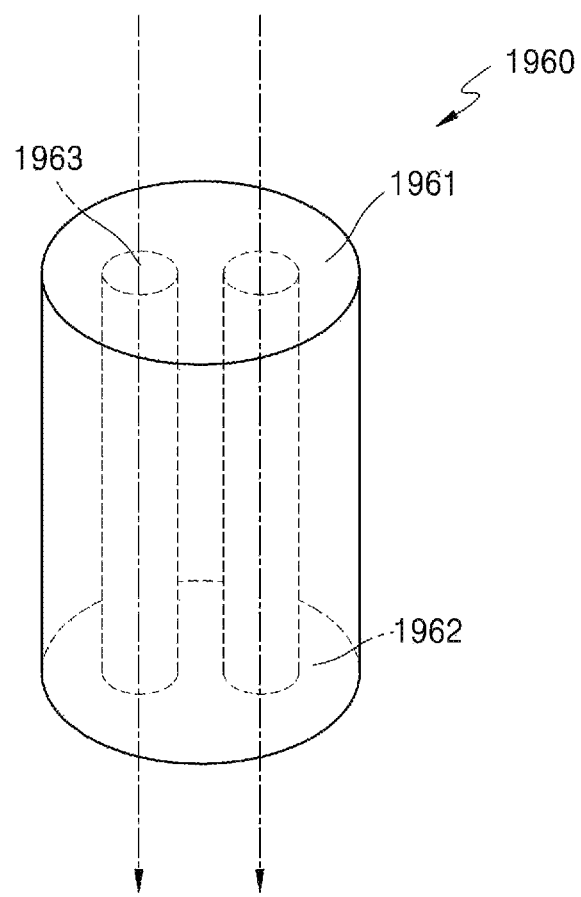

Referring to FIG. 19F, a cooling structure 1960 may include a first cross-section 1961 that borders on the first filter segment 321 and a second cross-section 1962 that borders on the second filter segment 323. Also, the cooling structure 1960 may include one or more tubular elements 1963. For example, the tubular element 1963 may penetrate through the first cross-section 1961 and the second cross-section 1962. Also, the tubular element 1963 may be packaged with a microporous packaging material and may be filled with a filler material (e.g., the granules described above with reference to FIG. 19D) that may increase the aerosol cooling effect.

As described above, the holder may generate aerosol by heating the cigarette. Also, aerosol may be generated independently by the holder or even when the holder is inserted into the cradle and is tilted. Particularly, when the holder is tilted, the heater may be heated by power of a battery of the cradle.

The embodiments of the present disclosure may be written as computer programs and can be implemented in general-use digital computers that execute the programs using a computer readable recording medium. In addition, the structure of the data used in the above-described method may be recorded on a computer-readable recording medium through various means. Examples of the computer readable recording medium include magnetic storage media (e.g., ROM, RAM, USB drives, floppy disks, hard disks, etc.), optical recording media (e.g., CD-ROMs, or DVDs), etc.

It will be understood by one of ordinary skill in the art that various changes in form and details may be made therein without departing from the spirit and scope of the present disclosure as defined by the appended claims. Therefore, the disclosed methods should be considered from an illustrative point of view, not from a restrictive point of view. The scope of the present disclosure is defined by the appended claims rather than by the foregoing description, and all differences within the scope of equivalents thereof should be construed as being included in the present disclosure.

What is claimed is:

1. An aerosol generating system comprising:
    a holder configured to generate aerosol by heating a cigarette;
    a cradle having an inner space for accommodating the holder, wherein the holder is moveable in the inner space of the cradle;
    at least one sensor configured to sense variation in a position of the holder in the inner space of the cradle; and
    a controller configured to make a prediction about insertion of the cigarette into the holder based on sensing of the sensor, and start first preheating of a heater of the holder before the cigarette is inserted in the holder based on a result of the prediction, and start second preheating of the heater of the holder after the cigarette is completely inserted in the holder,
    wherein the first preheating and the second preheating have different target temperature profiles.
2. The aerosol generating system of claim 1, wherein the sensor senses separation of the holder from the inner space of the cradle, and the controller is configured to start the first preheating based on the separation of the holder from the inner space of the cradle.
3. The aerosol generating system of claim 1, further comprising
    a power supply device,
    wherein the controller is configured to start the first preheating by using power supplied from the power supply device.
4. The aerosol generating system of claim 1, further comprising a power supply device disposed in the cradle,
    wherein the controller is configured to start the first preheating by using power supplied from the power supply device.
5. The aerosol generating system of claim 1, wherein the controller is configured to control the first preheating within a preset temperature range.
6. The aerosol generating system of claim 5, wherein the controller is configured to control the first preheating within a range of 100° C. to 350° C.
7. The aerosol generating system of claim 1, wherein the controller is configured to control the first preheating to heat the heater for a preset time period.
8. The aerosol generating system of claim 7, wherein the controller is configured to control the first preheating to heat the heater for 1 to 3 seconds.
9. The aerosol generating system of claim 1, wherein the holder comprises at least one input device for controlling functions of the holder, and
    the controller is configured to start the first preheating in response to receiving an input through the at least one input device.
10. An aerosol generating system comprising:
    a holder configured to generate aerosol by heating a cigarette;
    a cradle having an inner space for accommodating the holder, wherein the holder is moveable in the inner space of the cradle;
    a controller configured to make a prediction about insertion of the cigarette into the holder, and start preheating a heater of the holder before the cigarette is inserted in the holder, based on a result of the prediction; and
    a sensor configured to sense whether the cigarette is inserted into the holder,
    wherein the controller preheats the heater until the cigarette contacts a predetermined portion of the heater based on a sensing result of the sensor.
11. A method of generating aerosol by heating a cigarette in an aerosol generating system, the method comprising:
    making a prediction about insertion of the cigarette into a holder based on variation in a position of the holder that is accommodated in an inner space of a cradle;
    starting first preheating of a heater of the holder before the cigarette is inserted in the holder based on a result of the prediction, and
    starting second preheating of the heater of the holder after the cigarette is completely inserted in the holder,
    wherein the first preheating and the second preheating have different target temperature profiles.
12. The method of claim 11, wherein the making the prediction comprises:
    sensing variation in a position of the holder after the holder is inserted into an inner space of a cradle; and
    predicting the insertion of the cigarette into the holder based on a result of the sensing.
13. The method of claim 12, wherein the sensing of the variation in the position of the holder comprises sensing tilting of the holder after the holder is inserted into the inner space of the cradle.
14. The method of claim 12, wherein the sensing of the variation in the position of the holder comprises sensing separation of the holder from the inner space of the cradle.
15. A computer-readable recording medium having recorded thereon a program for performing the method of claim 11 on a computer.

* * * * *